(12) United States Patent
Fujita

(10) Patent No.: US 7,202,415 B2
(45) Date of Patent: Apr. 10, 2007

(54) WIRE HARNESS CONSTRUCTION

(75) Inventor: Tetsuya Fujita, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 11/252,595

(22) Filed: Oct. 19, 2005

(65) Prior Publication Data

US 2006/0090920 A1    May 4, 2006

(30) Foreign Application Priority Data

Oct. 20, 2004   (JP)   ............................. 2004-305678
Oct. 20, 2004   (JP)   ............................. 2004-305681
Oct. 20, 2004   (JP)   ............................. 2004-305693
Oct. 21, 2004   (JP)   ............................. 2004-307447

(51) Int. Cl.
    *H01B 7/00*    (2006.01)
(52) U.S. Cl. ..................... 174/72 A; 174/69; 174/72 R
(58) Field of Classification Search .............. 174/72 A, 174/69, 72 R
    See application file for complete search history.

(56) References Cited

U.S. PATENT DOCUMENTS 5,897,157 A    4/1999   Yamaguchi et al.
5,994,645 A   11/1999   Suzuki et al.
6,107,570 A    8/2000   Suzuki et al.
2002/0151197 A1  10/2002   Kawakita et al.

FOREIGN PATENT DOCUMENTS

JP       10- 000934       1/1998
JP       10- 016672       1/1998

OTHER PUBLICATIONS

English Language Abstract of JP 10-000934.
English Language Abstract of JP 10-016672.

*Primary Examiner*—Jinhee Lee
(74) *Attorney, Agent, or Firm*—Greenblum & Bernstein, P.L.C.

(57) ABSTRACT

A wire harness is slidably arranged between a vehicle body and an opening/closing member of the vehicle. A grommet is fitted onto one end of a wire harness, which is arranged in the opening/closing member and is pulled out toward the vehicle body. The grommet has a diaphragm portion that can swing, extend and contract. A tube having a predetermined length is fitted onto the wire harness. A first end of the tube is fitted onto the grommet, while a second end is fixed to the wire harness, so that the tube can be slidably received in a guiding portion provided in the opening/closing member. A surplus length portion is provided in the wire harness, which is pulled out from the tube, so that the wire harness can follow opening/closing operations of the opening/closing member. The surplus length portion is received in the surplus length absorbing space provided in the guiding portion, while the wire harness is locked onto the opening/closing member at an exit of the surplus length absorbing space.

11 Claims, 18 Drawing Sheets

WIRE HARNESS CONSTRUCTION

CROSS-REFERENCE TO RELATED APPLICATIONS

The present disclosure relates to subject matter contained in priority Japanese Application Nos. 2004-305681 filed on Oct. 20, 2004, 2004-305693, filed on Oct. 20, 2004, 2004-307447, filed on Oct. 21, 2004, and 2004-305678, filed on Oct. 20, 2004, the entire content of which are expressly incorporated by reference herein.

BACKGROUND OF THE INVENTION

1. Field of the Invention

The present invention relates to a wire harness construction provided between a vehicle body and an opening/closing member of the vehicle such as, for example, a door or a trunk lid.

2. Description of Related Art

An opening/closing member of a vehicle is attached to a vehicle by a hinge in a manner enabling easy opening and closing of the opening/closing member. Such members include doors, such as side-doors and rear doors, and other opening/closing members, such as trunk lids. If there are electric components provided in the opening/closing member, a wire harness is arranged from the vehicle body toward the opening/closing member.

Conventionally, as shown in FIG. 8, if a wire harness is arranged between a vehicle body and a side door of the vehicle, the wire harness (door harness) W/H is passed through an aperture 1b formed on the body side edge face of inner-panel 1a of door 1 and extends to body 3. Since the aperture 1b is located further outward on the door 1 than weather-strip 2 and the wire harness W/H is located below hinge H between the body and the door of the vehicle, the wire harness W/H only twists without extending or contracting as the door is opened or closed. However, passing the wire harness W/H through the aperture 1b is a very difficult operation. Therefore, there have been a number of proposals for arranging a wire harness on the body side of a vehicle door without a passing-through operation.

In arranging a wire harness on a vehicle door, when the wire harness is arranged from a passenger compartment side of an inner panel to the body side of the door, the wire harness is not passed through an aperture so that installment becomes easy. However, since the wire harness is arranged at a point closer to the passenger compartment side than a hinge joining the body and the door, it becomes necessary to extend or contract the wire harness as the door is opened or closed.

To address this problem, an applicant of the present patent application previously provided an invention disclosed in Japanese Patent Laid Open Publication H10-934, as shown in FIG. 9. In the wire harness arrangement construction shown in FIG. 9, a nearly-triangular space 1c is provided on the passenger compartment side of inner panel 1a of door 1, and a surplus length portion is provided in the wire harness W/H so that the wire harness W/H can follow the opening/closing movement of the door. The surplus length portion is accommodated in space 1c and pulled out from a pull-out opening of space 1c toward the body side of the door. In the above described configuration, the surplus length portion of the wire harness is pulled out from space 1c when the door is opened, and is accommodated in space 1c when the door is closed, thereby enabling the wire harness to follow the opening/closing movement of the door.

However, in the above-described configuration, since the wire harness is simply formed from a group of electric wires bundled together by taping, the rigidity of the wire harness is low. Therefore, there is a risk that the wire harness is not pulled into space 1c successfully when the door is closed. In this case, the wire harness is hung by gravity between the body and the door, which may jam the wire harness therebetween.

In the prior art configuration of Japanese Laid Open Publication H10-16672 shown in FIG. 10, a wire harness is protected by protector 5 having one end slidably fitted in sliding guide 8 provided on an inner panel of a door. The door side of protector 5 is attached to body 3 by connector 9 which oscillates.

Although the above-noted problems described in JP H10-934 are partially solved in JP H10-16672, other problems occur. In particular, protector 5 and sliding guide 8 need sufficient space so as to mutually slide in extension/contraction directions and to absorb a rotation direction movement accompanied by rotations of the door. This causes an abnormal sound in reaction to body vibrations of protector 5. On the other hand, insufficient space can make the sliding more difficult and may cause jamming. Further, since the wire harness bends sharply and extends inside the door, stress is repeatedly placed on one portion, which may damage the wire harness and decrease durability of the wire harness. Also, since the wire harness is continuously swung without being constrained inside the door, it may wear out due to friction with the inner panel or produce an abnormal sound in reaction to vehicle body vibrations. Particularly, because the wire harness is fixed to the door side by a clamp or the like, at 1d shown in FIGS. 9 and 10, bending stress is focused on the portion 1d of the wire harness. This may wear out and damage the wire harness. Additionally, when the wire harness is forcefully bent, excessive force is applied between protector 5 and slide guide 8, thereby hindering a smooth slide and causing abnormal sounds.

SUMMARY OF THE INVENTION

An aspect of the present invention provides a wire harness construction for installation between a vehicle body and an opening/closing member connected to the vehicle body by a hinge in a manner allowing the wire harness to extend, contract and rotate, the wire harness construction including a grommet fitted onto one end of the wire harness, the wire harness being configured for arrangement in the opening/closing member to be pulled toward the vehicle body; a body locking portion provided on an outer peripheral surface of a first end face of the grommet so as to be inserted and locked in an attachment hole of the vehicle body; a diaphragm portion provided between the body locking portion and a second end of the wire harness, the diaphragm portion being configured to swing, extend, and contract from the body locking portion; a tube having a predetermined length fitted onto the wire harness and being configured to be pulled out from the second end of the grommet, the tube having a first end fixed to the grommet and a second end fixed onto the wire harness; a guiding portion configured to slidably receive the tube, the guiding portion being configured to be provided in the opening/closing member; a surplus length portion of the wire harness configured to be pulled out from the tube, the surplus length portion allowing the wire harness to follow an opening/closing operation of the opening/closing member; and a surplus length absorbing space configured to receive the surplus length portion of the wire harness, the surplus length absorbing space being provided in the guiding portion and the wire harness being locked onto the opening/closing member at an exit position of the surplus length absorbing space.

Additionally, the diaphragm portion of the grommet connects a large-diameter tubular portion and a small-diameter tubular portion through a thin-wall connection tubular portion, the thin-wall connection tubular portion being inserted into the large-diameter tubular portion in a folded condition; and wherein, upon opening of the opening/closing member, the thin-wall connection tubular portion is configured to be bent while being pulled out from the large-diameter tubular portion. Further, the guiding portion of the opening/closing member has an opening that allows the tube to slidably pass through without letting the grommet through. The guiding portion connects a sliding space and the surplus length absorbing space, the sliding space configured to slidably receive the tube, and the surplus length absorbing space configured to receive the surplus length portion of the wire harness in a bent condition, wherein the guiding portion is formed by a substantially triangle shaped protector fixed to the opening/closing member. The protective component is attached to the surplus length portion of the wire harness, and wherein the protective component abuts an inner surface of the protector.

In a further aspect of the present invention, the opening/closing member is one of a side door, a rear door, and a trunk lid. The opening/closing member includes a side door, the side door including the guiding portion on a passenger compartment side of an inner panel of the side door, and wherein the tube being pulled out from the guiding portion passes through at a point closer to the passenger compartment than a weather-strip, the grommet being locked onto the vehicle body, and the wire harness wired to the body side of the opening/closing member. The grommet is formed of an elastic material; and the tube is rigid.

A further aspect of the present invention provides a wire harness construction for installation between a vehicle body and an opening/closing member connected to the vehicle body by a hinge in a manner allowing the wire harness to extend, contract, and rotate, the wire harness construction including a surplus length portion provided in the wire harness, the surplus length portion configured to allow the wire harness to follow an opening/closing operation of the opening/closing member; a tube fixed onto the wire harness extending from the surplus length portion to a body side of the opening/closing member; and a surplus length absorbing space provided in a guiding portion, the surplus length absorbing space slidably receiving the tube in the opening/closing member and the surplus length portion of the wire harness; wherein the wire harness is rotatably locked by a clamp to the opening/closing member at an exit of the guiding portion.

Additionally, the guiding portion includes a protector, the protector being fixed to the opening/closing member; and a substantially round locking hole formed at the exit of the protector; wherein the clamp attached to the wire harness includes a band, the clamp rotatably locking a locking wing portion into the locking hole, the locking wing portion being provided in a folded condition at a shaft projecting from the band locking portion. Further, the opening/closing member is a side door, the protector is attached to a passenger compartment side of the inner panel of the side door, the tube is slidably received in the exit of the protector, the tube passes through at a point closer to the passenger compartment side of the opening/closing member than a weather-strip and extends to the body side, a grommet is fixed onto an end of the tube, the grommet is fixedly inserted into the locking hole of the body, and the exit of the protector has a smaller diameter than that of the grommet so as to prevent the grommet from entering the protector.

An additional aspect of the present invention provides a construction for installation between a vehicle body and an opening/closing member connected to the vehicle body by a hinge in a manner allowing the wire harness to extend, contract, and rotate, the wire harness construction including a surplus length portion provided in the wire harness, the surplus length portion configured to follow an opening/closing operation of the opening/closing member; a flexible protector fitted onto the surplus length portion of the wire harness; a substantially rigid tubular protector fitted onto a portion of the wire harness located at a point closer the body side of the opening/closing member than the surplus length portion; a grommet fitted onto the wire harness and fixedly inserted into a locking hole formed in the body; and a protector guide provided in the opening/closing member; wherein an end of the substantially rigid tubular protector is fixed onto the grommet, and the substantially rigid tubular protector is slidably supported by the protector guide.

Further, the flexible protector and the substantially rigid tubular protector are formed of resin. The flexible protector and the substantially rigid tubular protector are formed one of integrally and in one piece, and separately. The door includes a side door of the vehicle, the protector guide is fixed onto an inner panel of the door, and the wire harness passes through the door at a point closer to the passenger compartment side than a weather strip and extends to the vehicle body; and the flexible protector includes a caterpillar shaped protector including a plurality of connecting portions; a pair of substantially trapezoidally shaped portions extending from each of the connecting portions; and a hinge provided between each of the plurality of connecting portions to allow the connecting portions to bend relative to each other.

An aspect of the present invention provides a wire harness construction for installation between a vehicle body and a door connected to the vehicle body by a hinge in a manner allowing the wire harness to extend, contract, and rotate, the wire harness construction including a module panel configured to be fixed on a panel of the door, the module panel having the wire harness provided thereon; a surplus length portion provided in the wire harness, allowing the wire harness to follow an opening/closing operation of the door; and a recessed guiding portion formed in the module panel, the recessed guiding portion including a surplus length absorbing space configured to receive the surplus length portion of the wire harness in a bent condition; and a sliding space connected to the surplus length absorbing space, allowing the wire harness to be slidably inserted into an opening formed on a body side end face of the door.

Further, the recessed guiding portion includes a substantially linear sliding space connecting to the opening on the body side end face of the door; a surplus length absorbing space formed in a substantially triangular shape, connecting to the other end of the sliding space; and a wire harness exit provided at one end of the surplus length absorbing space, wherein the wire harness is locked at the wire harness exit by a clamp, the wire harness passing through the sliding space is fixedly fitted into a tube, the tube slidably passes through the opening on the body side end face of the door, a front end of the tube is fixed to a grommet, and the grommet is fitted onto the wire harness and is inserted to and locked in a locking hole formed on the vehicle body. The door includes a side door; the module panel is fixed on a passenger compartment side of an inner panel and is located between the inner panel and an inner trim; and the wire harness passes through a point closer to the passenger compartment side than a weather-strip and extends to the vehicle body, the wire harness being pulled out from the opening on the body side end of the recessed guiding portion. The recessed guiding portion provided on the module panel has an opening on the inner trim side, and a support plate is attached to the module panel, covering the opening of the sliding space of the recessed guiding portion or substantially entire opening of the recessed guiding portion, and supporting the wire harness inside the sliding space.

The present invention is provided to address the above-described problems. When a wire harness is arranged in an opening/closing member, such as a door, to a body without a passing-through operation, the wire harness may reliably follow opening/closing operations of the opening/closing member. This arrangement is also designed to prevent occurrence of abnormal sounds without damaging the wire harness, which extends and contracts in accordance with the opening/closing operations of the opening/closing member. This arrangement is also designed to prevent the wire harness, which extends and contracts in accordance with the opening/closing operations of the opening/closing member, from being repeatedly and sharply bent, thereby preventing occurrence of abnormal sounds and damage to the wire harness; and to minimize the space required for the wire harness construction within the opening/closing member. The present invention is also provided to improve the operation and installation of the wire harness construction.

According to the above-noted configuration, the wire harness extends when the surplus length portion of the wire harness is pulled out from the surplus length absorbing space of the guiding portion in the opening operation of the opening/closing member, while the wire harness contracts when the surplus length portion is pulled into the surplus length absorbing space in the closing operation of the opening/closing member, following the opening/closing operation of the opening/closing member. Further, although the wire harness is twisted in the opening/closing operation, the twist is absorbed when the diaphragm portion of the grommet is twisted as well.

When following the above-noted opening/closing operation, the wire harness is passed through and fixed onto the linear hard tube. This configuration allows the hard tube, which is united to the wire harness, to move linearly, and reliably allows the surplus length portion of the wire harness to be pulled out from and into the surplus length absorbing space. This ensures that the wire harness will steadily follow the opening/closing operation of the opening/closing member. Further, the wire harness is protected by the hard tube when following the opening/closing operation, thereby preventing the wire harness from being jammed between the body and the opening/closing member and being damaged.

Further, the hard tube is made of a cylindrical hard resin material. When an outer peripheral surface of the hard tube has a smooth surface, occurrence of abnormal sounds can be reduced as the hard tube slides in contact with the guiding portion. The hard tube may be square-shaped so that it is fitted into the sliding space in a manner that allows it to slide freely in contact with the guiding portion. When the hard tube is square-shaped, the hard tube may be integrally formed in a tubular shape. The hard tube may further be made of two components: a body having a U-shape when viewed cross-sectionally and a lid closing an opening of the body. In that case, the body is connected to the lid by locking to form a square tube. When the hard tube is made of the body and the lid, the body is made of a bottom wall and side walls projecting from both sides of the bottom wall, and creates a U-shaped when viewed cross-sectionally; the lid is also made of the bottom wall and the side walls projecting from the both sides of the bottom wall, and creates a U-shape when viewed cross-sectionally. Preferably, when the body and the lid are connected by locking, the side walls of the lid are housed in the body, the side walls of the lid being fitted along the side walls of the body, so that the opening of the body is closed by a closing wall of the lid.

When the thin-wall connection tubular portion is provided in the diaphragm portion, the diaphragm portion may be twisted to the left and right in the opening/closing operation of the opening/closing member. Therefore, although at least the left and right sides of the thin-wall connection need to be thin, the upper and lower sides do not need to be thin.

Within the diaphragm portion, the thin-wall connection tubular portion is inserted into the large-diameter tubular portion in an original folded condition. This may pull the wire harness out from the large-diameter tubular portion in the opening operation of the opening/closing member. As a result, the grommet itself may be extended as much as the length of the thin-wall connection tubular portion, thereby enabling the wire harness to smoothly follow the opening/closing operation. On the other hand, the thin-wall connection tubular portion returns to the original folded condition in the closing operation of the opening/closing member, thereby enabling the wire harness to smoothly follow the opening/closing operation. In addition, when the opening/closing member is closed, a space between the body and the opening/closing member gets narrower. However, since the length of the grommet itself gets shorter as well, the grommet may be well accommodated in the narrow space.

In the above-noted configuration, since the wire harness, which is passed through the opening of the guiding portion, is protected by the hard tube, the wire harness does not slide in contact with an inner surface of the opening. The wire harness can thus smoothly enter and exist from the guiding portion along with the hard tube. The grommet fixed on one end of the hard tube cannot be passed through the opening of the guiding portion. Also, the grommet is configured to be stopped at the opening of the guiding portion when the surplus length portion of the wire harness is pulled into the surplus length absorbing space. As a result, a pull-in degree of the wire harness is controlled. Further, in order to absorb a movement of the opening/closing member in the direction of rotation, a space needs to be provided between the hard tube and the guiding portion. When the grommet abuts on and is pressed against the guiding portion, the grommet and the hard tube are fixed to the guiding portion, thereby preventing occurrence of abnormal sounds in reaction to body vibrations of the hard tube.

As described above, forming the guiding portion from the protector makes it possible to provide the sliding space with a predetermined length and the surplus length absorbing space with high dimensional accuracy. This also eliminates the need to change the conventional configuration of the inner panel and door trim, thereby facilitating assembly steps. The protector may be configured to have an upper wall opposite to the bottom wall without providing an opening on the passenger compartment side and an opening at one of respective sides of the peripheral wall, so that the opening can be closed with a cover, after the wire harness is wired within the protector through the opening. This configuration may prevent the wire harness within the protector from directly contacting the door inner panel and the door trim at the bottom wall and the upper wall. Further, instead of providing a protector made of different material as the guiding portion, it is also possible to provide the wire harness and a door module panel that assembles electronic components connected to the wire harness, while a recess of a shape similar to the protector may be provided as the guiding portion on the door module panel.

Further, it is preferable that a protective material having smoothness is attached to the surplus length portion of the wire harness, so that the protective material is slidably connected to an inner side of the protector. More specifically, the protective material is a thin plate having a projecting step in a central region. Both ends of the protective material are fixed to the wire harness by taping, while the projecting step in the central region slides in contact with the inner surface of the protector. As described above, the attachment of the protective material allows the wire harness to slide smoothly without directly contacting the inner surface of the protector. This may further reduce the wear of the wire harness, which is caused by repeated movements associated with the opening/closing operation of the opening/closing material.

The opening/closing member includes a side door, a back door, a trunk lid, etc. The opening/closing member is connected to an automotive body by a hinge. Further, the invention is applicable to any opening/closing member as long as it is mountable with a wire harness connected to the body side.

It is particularly preferable that the present invention is applied to a side door having various electronic components. The guiding portion constituted by the protector is provided on the passenger compartment side of the inner panel of the side door. The hard tube, which is pulled out from the guiding portion, is located at a point closer to the passenger compartment side than a weather strip. The grommet is locked onto the body, thereby installing the wire harness on the body side.

As described above, when the present invention is applied to an arrangement structure where the door harness wired on the side door is arranged on the body side, the door harness is located at a point closer to the passenger compartment side than the weather strip. This eliminates labor to have the door harness pass through a through hole provided on the end face of the inner panel, resulting in a significant improvement in workability in arranging the wire harness.

As described above, the present invention positions the wire harness away from a rotation fulcrum (hinge position) between the opening/closing member, such as a door, and the body. In this configuration, since the wire harness is not passed through a through hole formed on the opening/closing member (i.e., "no passing-through" structure), an easy arrangement of the wire harness can be achieved. In the above-noted arrangement, the wire harness needs to be extended or contracted, following the opening/closing operation of the opening/closing member. However, since the wire harness is passed through the hard tube to enable an entry/exit operation to the opening/closing member, it is possible to smoothly put and pull the surplus length portion of the wire harness in and out of the surplus length absorbing space of the guiding portion of the opening/closing member, without creating a slack in the wire harness. Further, it may suppress resistance while the wire harness is in operation, thereby reducing occurrence of abnormal sounds. Furthermore, twist direction movements may be smoothly absorbed because of the diaphragm portion provided in the grommet. Further, since the surplus length portion of the wire harness is accommodated in the surplus length housing space, having a gentle curve in the guiding portion of the protector, it may prevent the wire harness from being damaged by repeated twists. As described above, the wire harness arrangement structure in the present invention provides a structure for installing a wire harness in an opening/closing member of a vehicle, wherein extensions and twists of the wire harness are smoothly accommodated without causing operational discomfort or abnormal noises. The structure also excels in its water-immersion proof capability, durability, and assembly ease.

Additionally, since the surplus length portion of the wire harness may be supported by a caterpillar shaped protector alone in both a bending condition and a condition extended from the bending condition by simply attaching the caterpillar shaped protector, it is sufficient to provide a space allowing the surplus length portion to bend and deform, thus eliminating the need to separately prepare a surplus length absorbing space.

The caterpillar-shaped protector and the straight tubular protector may be formed integrally and in one piece, or separately formed of a suitable material such as, for example, a resin component. In particular, integrally making the caterpillar-shaped protector and the straight tubular protector of a resin component has an advantage in reducing cost. Further, it is also possible to make the straight tubular protector of a hard resin and the caterpillar-shaped protector of a softer resin, and integrally connecting the two to form a two-color configuration.

The surplus length portion of the wire harness, onto which the caterpillar-shaped protector is fitted, can smoothly bend, and therefore, can smoothly deform when being pulled out toward the body side or pulled into of the opening/closing member in response to the opening/closing operation of the opening/closing member, and can follow the extending and contracting operations of the wire harness. Further, since the outer peripheral surface of the wire harness is covered by connecting portions and a large number of small piece portions, the wire harness may be prevented from directly contacting a panel when following the opening/closing operation of the opening/closing member, resulting in the successful protection of the wire harness.

Further, since the surplus length portion of the wire harness may be supported by the caterpillar-shaped protector alone in both a bending condition and a condition extended from the bending condition by simply attaching the caterpillar-shaped protector, it is sufficient to provide a space allowing the surplus length portion to bend and deform, thus eliminating the need to separately prepare a surplus length absorbing space.

In this configuration, extension and contraction of the wire harness are absorbed by the deformation of the surplus length portion of the wire harness. The portion of the wire harness located at a point closer to the body side than the surplus length portion is attached by the straight tubular protector and moves without creating slack in the wire harness, thereby preventing the wire harness from being jammed between the body and the opening/closing member and from being damaged accidentally.

In the embodiment including the straight tubular protector having a square shaped cross section, misalignment of the straight tubular protector relative to the grommet in the rotation direction can be avoided, thereby making it possible to more securely fix the straight tubular protector to the grommet.

In the embodiment of the present invention including a module panel, on which the wire harness is provided and electric components are mounted in advance, by mounting the module panel to the door, the door harness and the required electric components are collectively installed in the door, so that the assembly process in an assembly line is significantly simplified, thereby making it possible to improve working efficiency and to reduce burden on the assemblers. Further, since a surplus length absorbing space capable of accommodating the surplus length portion of the wire harness is provided in advance on the module panel, it is not necessary to separately provide a part including the surplus length absorbing space.

Accordingly, since the wire harness is passed through a point closer to the passenger compartment side than a weather-strip, it is possible to eliminate, at an automobile assembly line, the difficult process of passing the wire harness through an aperture on the door side, and to further enhance the advantage of using the module panel.

The concave or recessed guiding portion provided on the module panel has an opening on the inner trim side. And, a support plate is attached to the module panel, covering the opening of the sliding space of the recessed guiding portion or nearly the whole opening of the recessed guiding portion, and supporting the wire harness inside the sliding space.

According to the above-noted configuration, when mounting parts to a module panel at a sub-line other than an automobile assembly line or at an autopart maker, since the recessed guiding portion has an opening on the inner trim side and a wire harness can be attached to the upper portion of the opening of the sliding space by using a support plate, working efficiency can be improved, compared to the case of passing a wire harness though an aperture. And, replacing a wire harness at a service factory also becomes easier.

Further, when nearly the entire opening of the concaved guiding portion is covered by a support plate, the wire harness being passed through the recessed guiding portion can be protected by the support plate from external interfering objects during transportation.

BRIEF DESCRIPTION OF THE DRAWINGS

The above, and other objects, features and advantages of the present invention will be made apparent from the following description of the preferred embodiments, given as nonlimiting examples, with reference to the accompanying drawings in which.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1A:
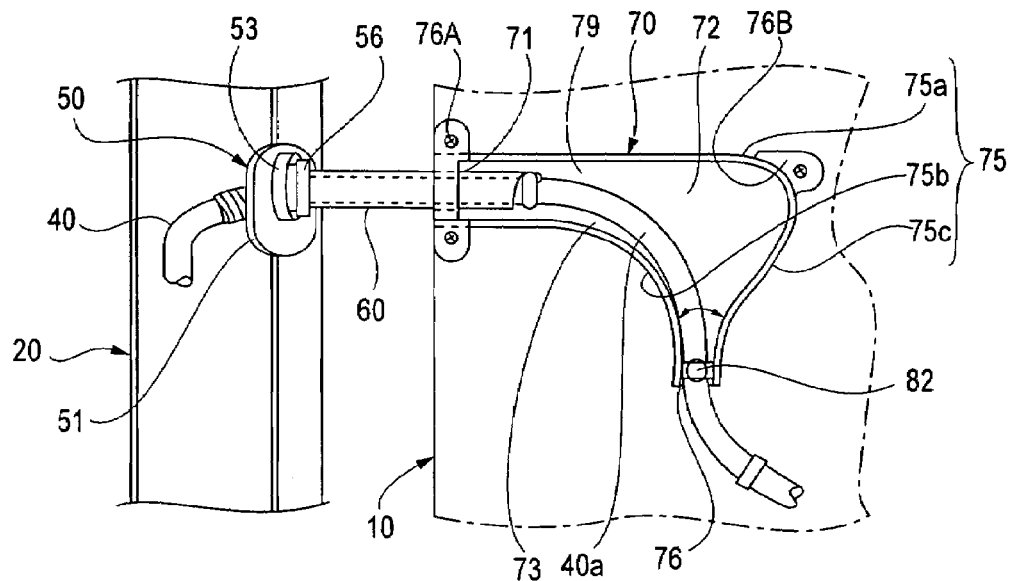
FIG. 1A is a side elevational view of an open side door, when viewed from the passenger compartment, including a wire harness construction according to a first embodiment of the present invention.
Figure 1B:
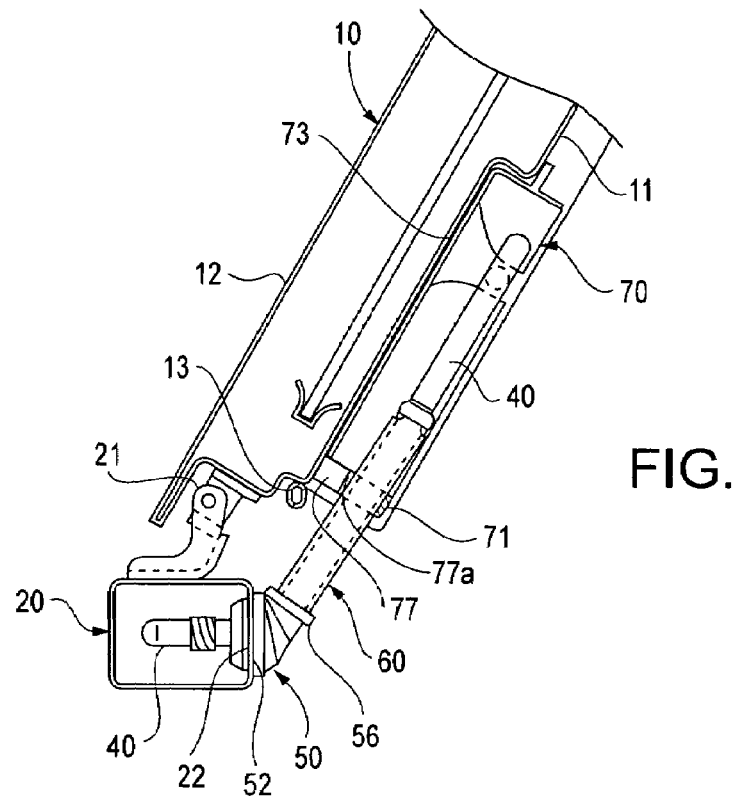
FIG. 1B is a cross-sectional view of the open side door including the wire harness construction according to FIG. 1A.

The embodiments of the present invention are explained in detail in the following in reference to the above-described drawings. FIGS. 1 through 6 illustrate a first embodiment of the present invention. Wire harness (i.e., door harness) 40 mounted on side door 10 (hereinafter referred to as door 10) extends to body 20 of a vehicle. FIGS. 1A and 1B illustrate door 10 in an open position and FIGS. 2A and 2B illustrate door 10 in a closed position.

Outer panel 12 and inner panel 11 are connected on door 10. Protector 70 is provided on the passenger compartment side of the door 10 toward the body side of inner panel 11. Protector 70 may be formed of any suitable material such as, for example, a resin material; and protector 70 may be fixed on the passenger compartment side of the door 10. A door trim (no figure) is also attached to inner panel 11. On door 10, a body side end face of inner panel 11 is connected to body 20 by hinge 21. Door 10 is thus rotatably connected around hinge 21.

Wire harness 40 is mounted within inner panel 11 and its ends are connected to predetermined electronic components via connectors (not shown) attached to its ends. Wire harness 40 passes through protector 70 and exits through the body side end face of inner panel 11 on the passenger compartment side of weather-strip 13. Wire harness 40 has grommet 50 fixed onto one end thereof. Grommet 50 is fixedly inserted into attachment hole 22 of body 20. Tube 60 is connected to grommet 50, wrapping wire harness 40. Tube 60 is substantially rigid such that it can not be bent easily, and may formed of any suitable material such as, for example, resin. Rigid tube 60 is accommodated in such a way that it can move freely in and out of protector 70.

Figure 2A:
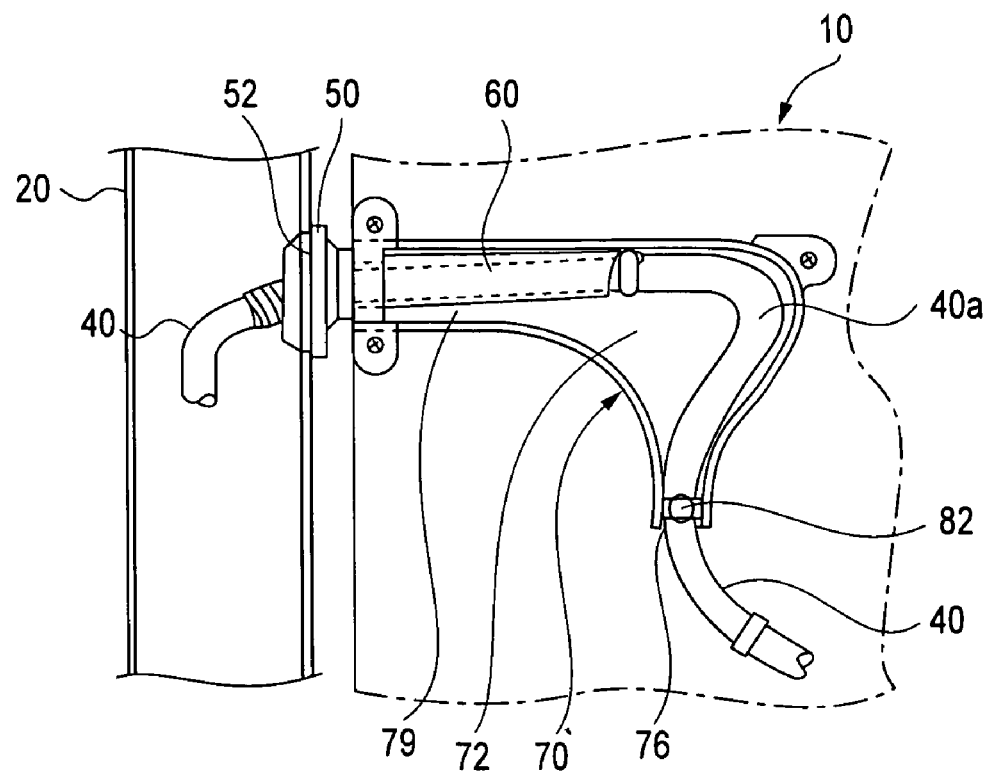
FIG. 2A is a side elevational view of the closed side door, when viewed from the passenger compartment side, including the harness construction according to FIG. 1A.
Figure 2B:
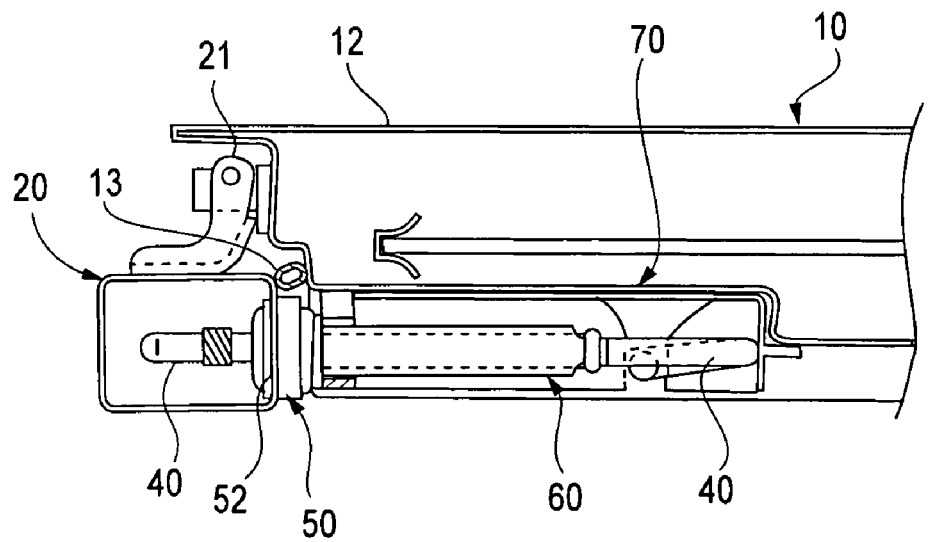
FIG. 2B is a cross-sectional view of the closed side door including the wire harness construction according to FIG. 1A.

As shown in FIGS. 1A and 2A, protector 70 is substantially triangle shaped, with a shallow bottom. Bottom wall 73 has guiding peripheral wall 75 projecting from its respective sides. Upper peripheral wall 75a has a linear shape. Side peripheral wall 75b is positioned far from sliding space 79 and upper peripheral wall 75a, and makes a gentle curve toward a lower direction. Side peripheral wall 75c on the other end makes a gentle curve to approach side peripheral wall 75b. Entry/exit opening 71 is provided on one end of sliding space 79, and a lower-edge opening is provided as pull-out opening 76 between the pair of side peripheral walls 75b and 75c, leading to the interior of the door. A large space is provided as surplus length absorbing space 72 between sliding space 79 and pull-out opening 76. Surplus length absorbing space 72 makes a gentle large radius curve toward a corner portion of upper peripheral wall 75a and side peripheral wall 75c. By adapting a guiding portion formed of protector 70 to the above described shape, wire harness 40 is guided linearly within sliding space 79. Also, wire harness 40 is prevented from being sharply bent within surplus length absorbing space 72, thereby avoiding stress convergence on predetermined locations.

On an inner side of entry/exit opening 71 provided on one end of sliding space 79, closed wall 77 is positioned between upper peripheral wall 75a and side peripheral wall 75b and an aperture 77a is formed on closed wall 77. Flange portion 76A projects from an outer surface of protector 70 near entry/exit opening 71, and flange portion 76B projects from an outer surface of the corner portion of protector 70. These flange portions 76A and 76B may be attached to inner panel 11 by any suitable attaching device such as, for example, by screws.

Figure 3:
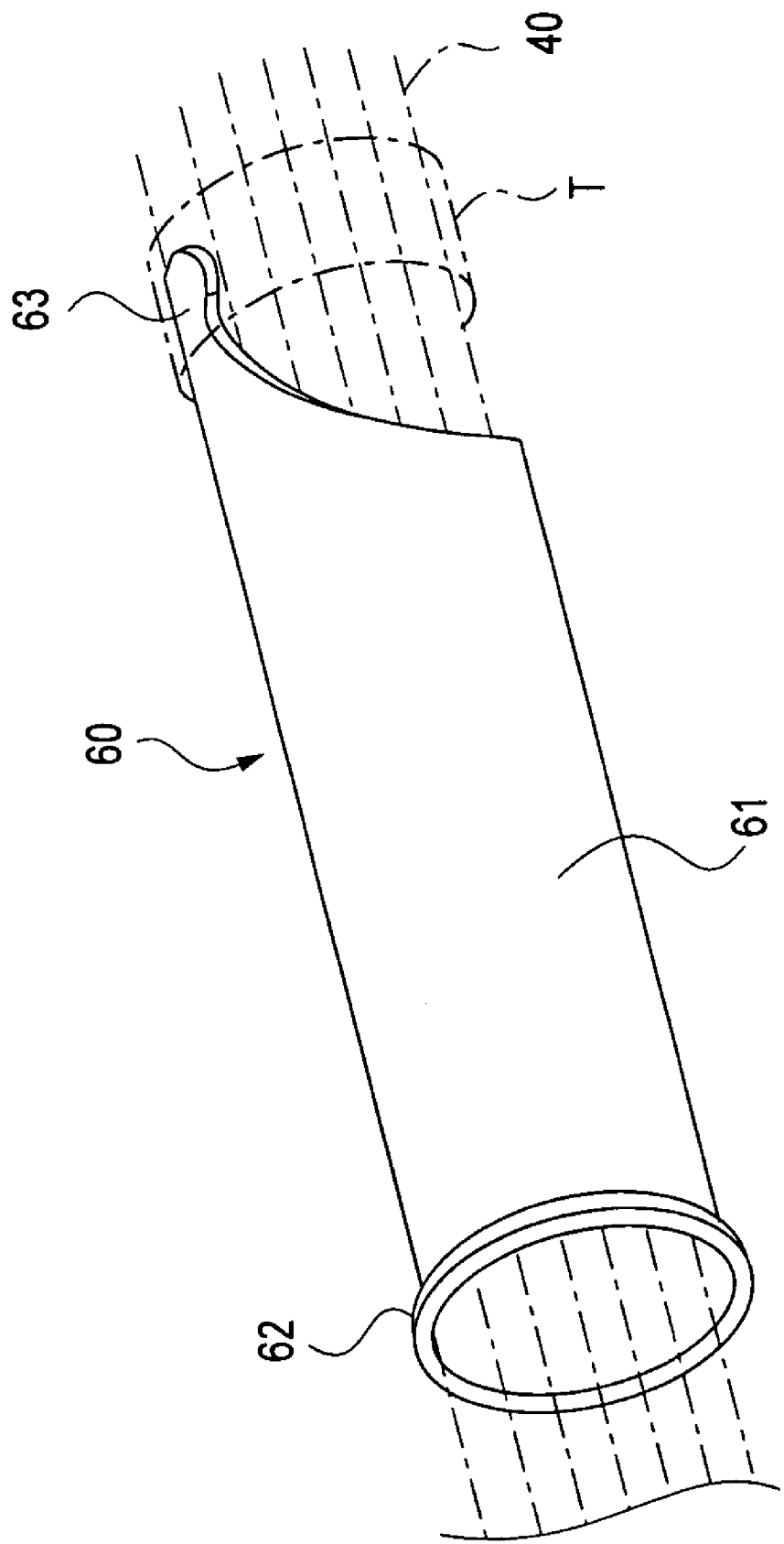
FIG. 3 is a perspective view of a tube of the wire harness construction according to FIG. 1A.

As shown in FIG. 3, tube 60 is made of a hard resin that cannot be easily bent. Flange 62 is provided at one end of cylindrical body 61 and is fitted into grommet 50. Flange 62 may be formed integrally and in one piece with the cylindrical body. Alternatively, tube 60 may include a separate ring that may be fixedly fitted onto the cylindrical body. The other end of tube 60 includes a tape winding tongue 63, which is fixed to wire harness 40 by winding tape T. Tube 60 is shown as cylindrical in the present embodiment. However, alternatively, tube 60 may include a square tube so that a rotation direction of the wire harness and tube 60 can be predetermined.

Figure 4A:
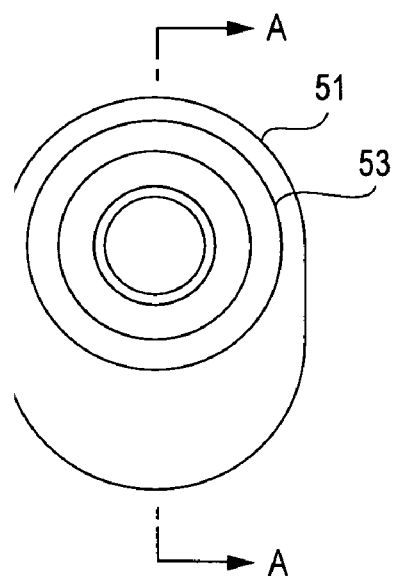
FIG. 4A is a front elevational view of a grommet, when viewed from the door side of the vehicle body, of the wire harness construction according to FIG. 1A.
Figure 4B:
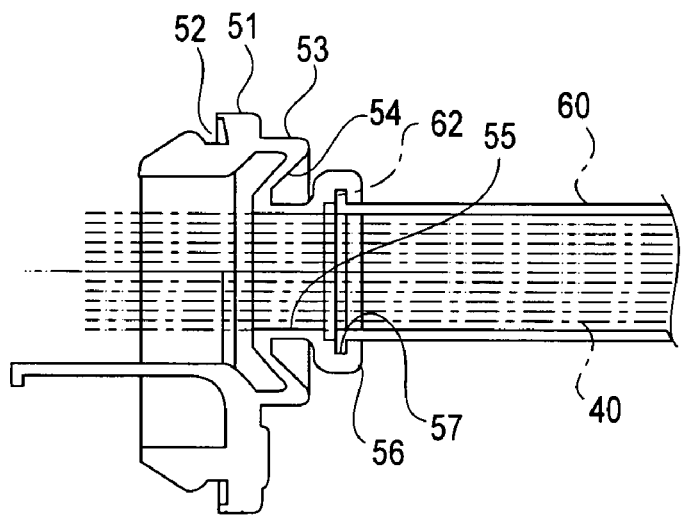
FIG. 4B is a cross-sectional view taken along line A—A of the grommet of FIG. 4A.
Figure 4C:
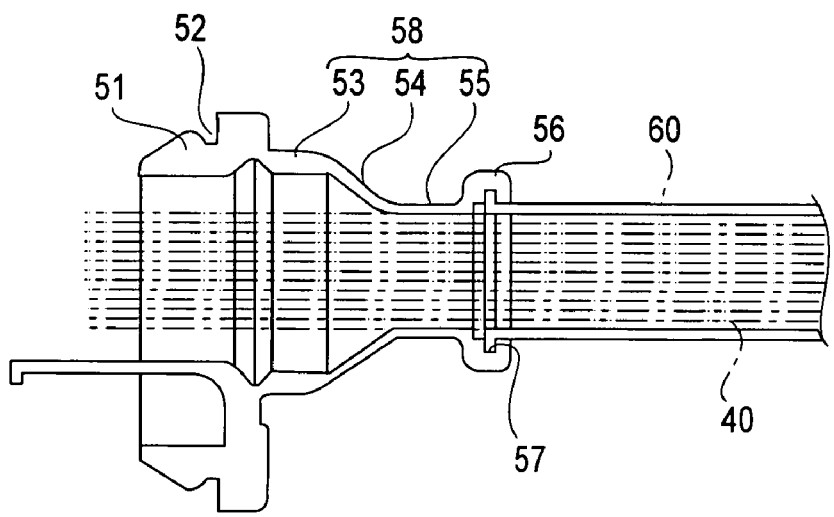
FIG. 4C is a cross-sectional view taken along line A—A of the grommet of FIG. 4A in an extended condition.

Grommet 50 is shaped as shown in FIG. 4. FIG. 4A is a front elevational view of the grommet when viewed from the door side of the vehicle body; FIG. 4B is a cross-sectional view of the grommet in its original shape at free length; and FIG. 4C is a cross-sectional view of the grommet when the door is open. Grommet 50 is formed integrally and in one piece of a suitable elastic material such as, for example, a rubber or an elastomer, and has a tubular shape so that the wire harness can be passed therethrough. Substantially oval shaped outermost tubular portion 51 is provided on one end along an axial direction of the grommet 50, and body locking portion 52 is recessed from an outer peripheral surface of outermost tubular portion 51. The outer peripheral surface that extends beyond body locking portion 52 toward the end of the grommet 50 is inclined so as to facilitate an easy insertion into locking hole 22 of body 20.

Large-diameter tubular portion 53 has a circular shape and is connected to outermost tubular portion 51 in an eccentric position. Large-diameter tubular portion 53 is further connected to small-diameter tubular portion 55 through thin-wall connection tubular portion 54. Press-contact tubular portion 56 is positioned on one end of small-diameter tubular portion 55. Large-diameter tubular portion 53, thin-wall connection tubular portion 54, and small-diameter tubular portion 55 constitute diaphragm portion 58 that varies the length of the grommet 50 in an axial direction. Thin-wall connection tubular portion 54 is constructed so as to project into large-diameter tubular portion 53 in a folded condition ahead of the location at which it is connected to small-diameter tubular portion 55. That is, as shown in FIG. 4B, thin-wall connection tubular portion 54 folds back toward the left side of the grommet as shown FIG. 4B before its connection to small-diameter tubular portion 55. When pulled outward, small-diameter tubular portion 55 is pulled out from large-diameter tubular portion 53. When the pulling force on small-diameter tubular portion 55 is released, small-diameter tubular portion 55 returns to its original shape and retreats into large-diameter tubular portion 53. In other words, grommet 50 can be extended and contracted at diaphragm portion 58 for predetermined lengths in an axial direction. Upon the closing of door 10, grommet 50 becomes shorter as shown in FIG. 4B and is housed in a narrow space between door 10 and body 20.

Upon the opening of door 10, grommet 50 extends in accordance with the pulling force of wire harness 40 and moves in the rotation direction of door 10.

Tube locking groove 57 is positioned within press-contact tubular portion 56 in a projecting manner. Flange 62 of tube 60 is fitted into tube locking groove 57. Press-contact tubular portion 56 has an outer diameter that cannot be passed through the aperture 77*a* of protector 70. At the closing of door 10, press-contact tubular portion 56 comes into contact with closed wall 77 and is fixed thereon in a collapsed condition. This configuration prevents the occurrence of abnormal sounds due to, for example, vehicle body vibrations even when there is a backlash between tube 60 and entry/exit opening 74 of protector 70.

Figure 6:
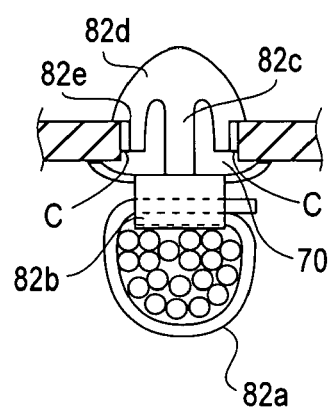
FIG. 6 is a cross-sectional view of a clamp of the wire harness construction according to FIG. 1A.

Wire harness 40 passes through tube 60 and is fixed thereon by tape T before it is passed through grommet 50. Tube 60, with one end fixedly fitted into press-contact tubular portion 56, is slidably housed in sliding space 79 of protector 70. A predetermined length of the portion of the wire harness that extends beyond the point where the wire harness is fixed by tube 60 and tape T forms surplus length portion 40*a*. Surplus length portion 40*a* is housed in surplus length absorbing space 72 of protector 70. As shown in FIG. 6, surplus length portion 40*a* is locked at its terminal end by band-shaped clamp 82, which is positioned at pull-out opening 76 of protector 70.

Clamp 82 is made of any suitable material such as, for example, an elastic resin material. Clamp 82 has band latch 82*b* at a base portion of band 82*a*. Wire harness 40 is wrapped by band 82*a* and is locked by band latch 82*b*. Locking shaft 82*c* projects from band latch 82*b*. Locking wing 82*d* further projects from locking shaft 82*c* in a downwardly folded condition; locking step 82*e* is formed at one end of locking wing 82*d*. Locking step 82*e* of locking wing 82*d* is fixed into locking hole 78, which is formed in protector 70, while leaving gap C, which allows locking step 82*e* to rotate. In the above-noted configuration, wire harness 40 is rotatably locked onto protector 70 through clamp 82. Therefore, clamp 82 swings in the direction shown by the double-headed arrow in FIG. 1A, thereby reducing the bend of wire harness 40. In the above-described configuration, because locking hole 78 formed on the protector has a substantially round shape, clamp 82 may rotate around locking shaft 82*c*, thus allowing wire harness 40 attached to clamp 82 to rotate as well. Clamp 82 may be formed integrally and in one piece of any suitable material such as, for example, resin. Clamp 82 locks wire harness 40 by simply inserting locking wing 82 into locking hole 78 after binding wire harness 40 by band 82*a*, resulting in an improvement in workability.

Figure 5:
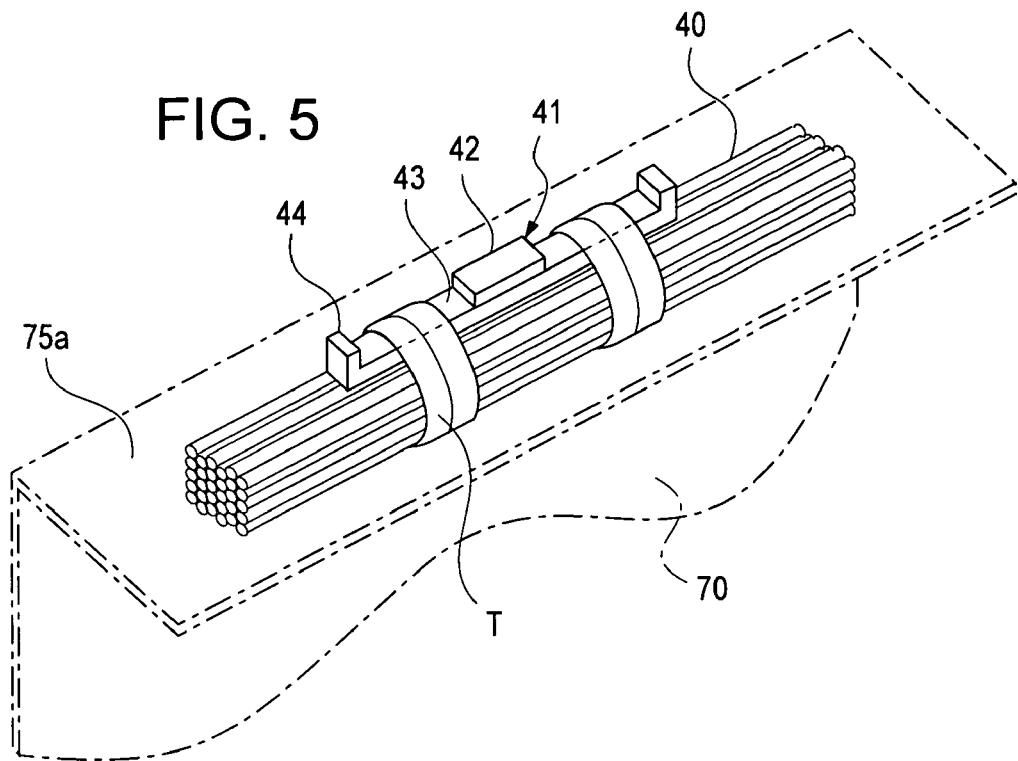
FIG. 5 is a perspective view of a protective material being attached to the wire harness of the wire harness construction according to FIG. 1A.

Surplus length portion 40*a* which extends beyond the point where the wire harness is fixed to tube 60 by tape T is fixed to protective component 41 by winding tape T as shown in FIG. 5. Protective component 41 may be formed of any suitable material such as, for example, a resin material that is smooth. Step shaped projecting portion 42 is formed in a central region of rectangular base board 43. Protective component 41 also has ribs 44 on both ends. Protective component 41 positions step shaped projecting portion 42 in a manner that allows step shaped projecting portion 42 to freely slide in contact with the inner surface of upper peripheral wall 75*a* of protector 70. This configuration prevents direct contact between wire harness 40 and the inner surface of protector 70, thereby protecting wire harness 40 from wear, while facilitating smooth movement of wire harness 40.

The following describes operations of wire harness 40 at the opening and closing of the door, in the construction of the wire harness according to the embodiment of the present invention. When the closed door 10 shown in FIGS. 2A and 2B is opened as shown in FIGS. 1A and 1B, thin-wall connection tubular portion 54 of grommet 50 is bent according to rotation of door 10, thereby allowing grommet 50 to follow the bend of wire harness 40 mounted on door 10. Further, at the opening of door 10, the rotation fulcrum of door 10 is located away from the point where wire harness 40 is mounted. Thus, it is necessary to extend wire harness 40 to follow the opening/closing operations of the door. When door 10 is closed as shown in FIGS. 2A and 2B, surplus length portion 40*a* of wire harness 40 is bent along the corner portion of surplus length housing space 72. From this state, tube 60 moves within sliding space 79 toward the left side of FIG. 2A, following the opening operation of door 10. Tube 60 is then pulled out toward body 20 through the aperture 77*a* and pull-out opening 74. In accordance with this movement, surplus length portion 40*a* within surplus length absorbing space 72 comes closer to side peripheral wall 75*b* as it is pulled out, thus changing from a curved condition to an inclined condition to reach the condition illustrated in FIG. 1.

When door 10 is closed from the opened state shown in FIGS. 1A and 1B, an operation reverse to the opening operation is performed, wherein wire harness 40, along with tube 60, is pushed into protector 70. Surplus length portion 40*a* of wire harness 40 bends along the corner portion of surplus length absorbing space 72 while being pulled in until it is housed in surplus length absorbing space 72. Tube 60 is pulled into protector 70 and grommet 50 moves toward protector 70 accordingly. Press-contact tubular portion 56 of grommet 50 then comes into contact with closed wall 77 to stop. Door 10 is completely closed in this condition.

As described above, since wire harness 40, which enters and exits the aperture 77*a* of protector 70 at the opening/closing of door 10, is protected by tube 60, wire harness 40 does not slide in contact with the inner surface of the aperture 77*a*, thereby enabling its smooth entry/exit along with tube 60. In addition, wire harness 40 extends and contracts linearly without going slack between door 10 and body 20, unlike a configuration that uses only a wire harness. This prevents wire harness 40 from being jammed between door 10 and body 20. Further, since grommet 50 fixed at one end of tube 60 cannot be passed through the aperture 77*a* of protector 70, grommet 50 is stopped at the aperture 77*a* of protector 70 at the closing of the door, thereby controlling the degree to which wire harness 40 is pulled in. Moreover, a gap is provided between tube 60 and the aperture 77*a* in order to absorb movements of door 10 in a rotation direction. However, since grommet 50 abuts on and is pressed against closed wall 77 of protector 70, tube 60 is fixed along with grommet 50, thus preventing tube 60 from making abnormal sounds in reaction to vehicle body vibrations.

Figure 7:
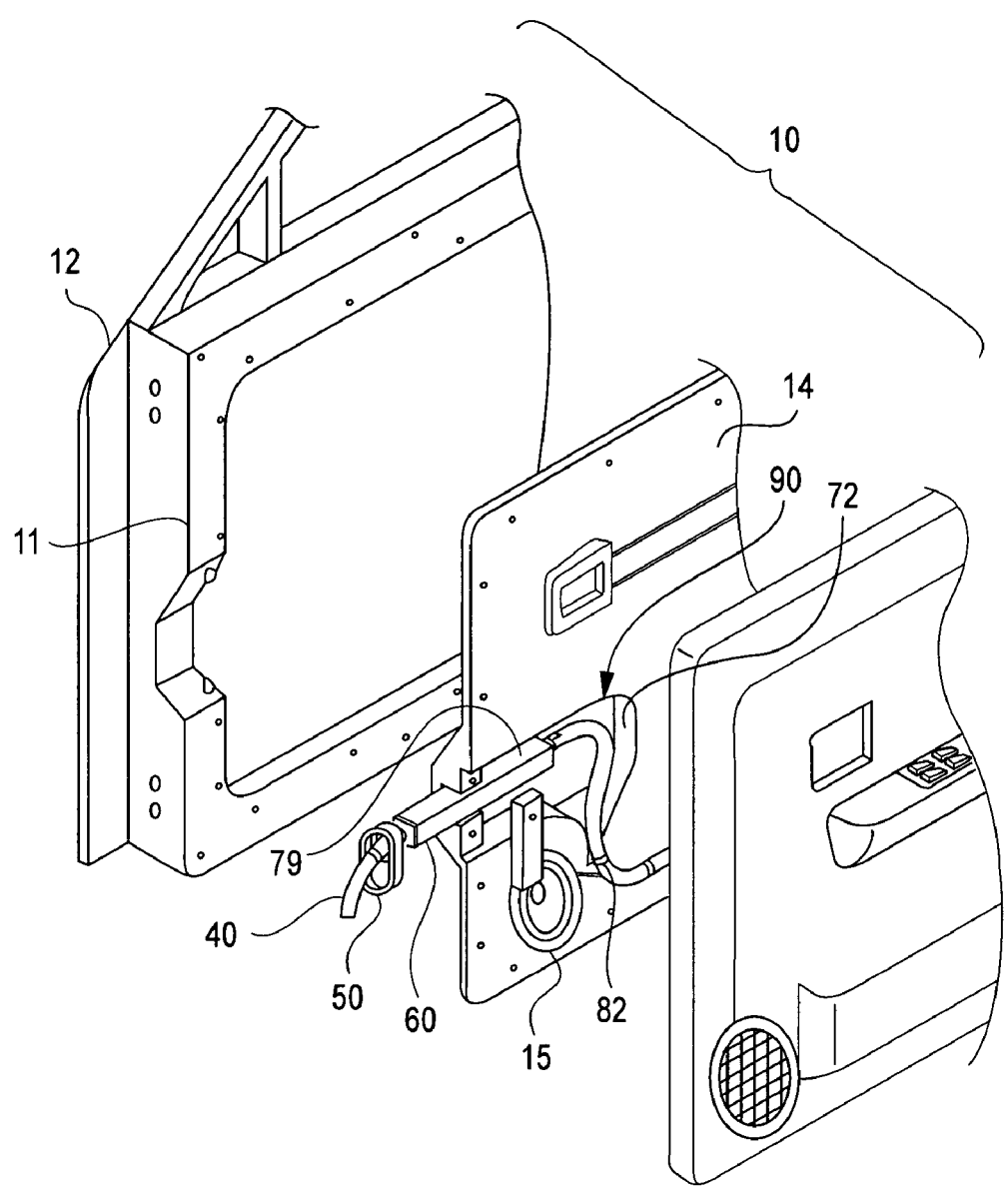
FIG. 7 is a perspective view of a wire harness construction according to a second embodiment of the present invention.
Figure 8:
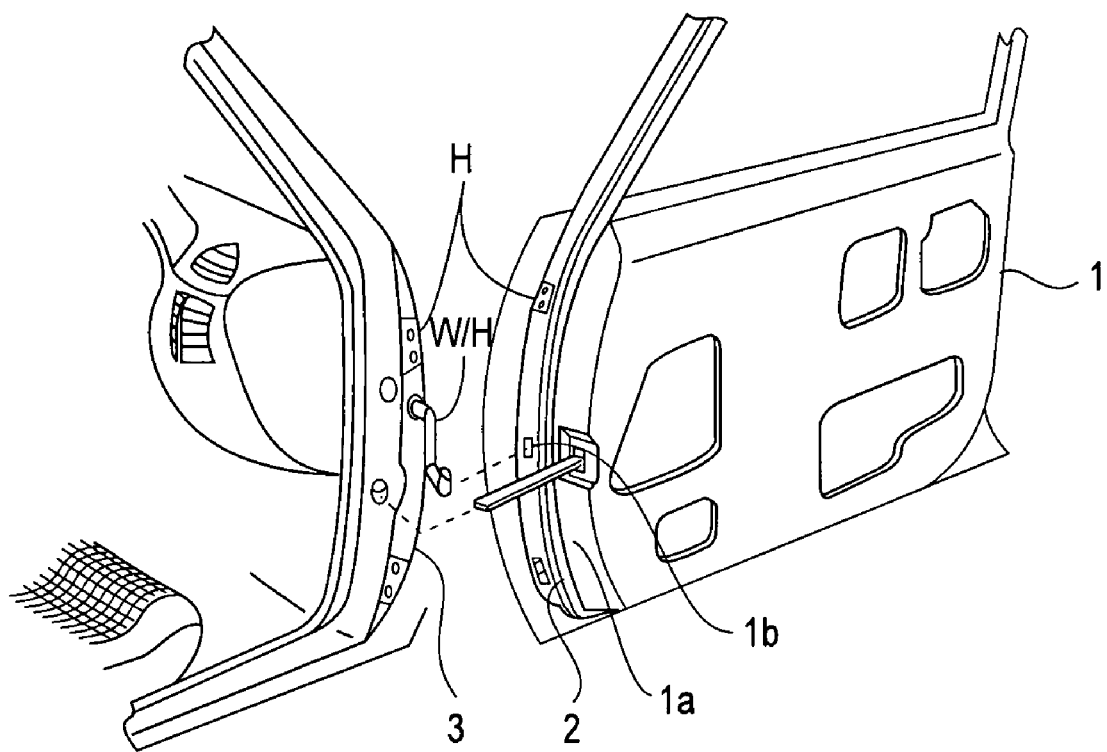
FIG. 8 is a perspective view of a first prior art wire harness.
Figure 9:
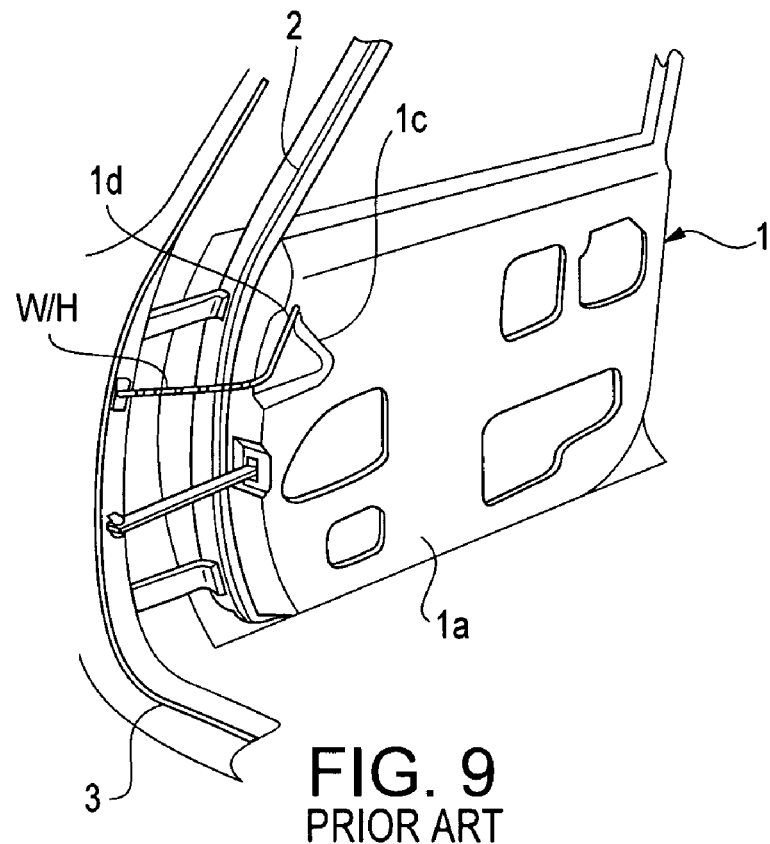
FIG. 9 is a perspective view of a second prior art wire harness.
Figure 10:
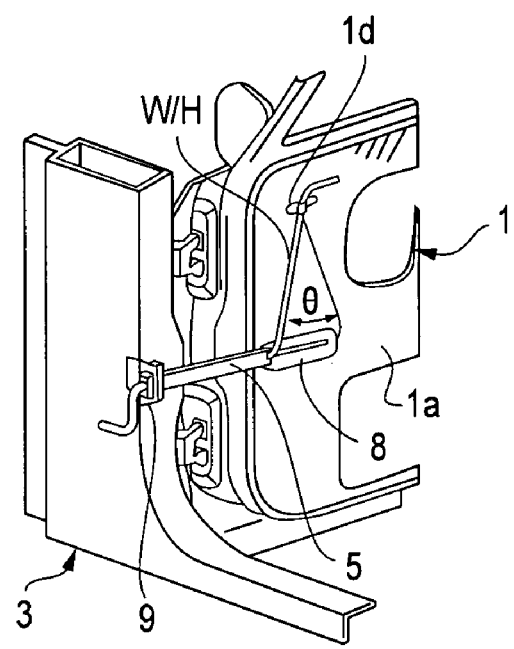
FIG. 10 is a perspective view of a third prior art wire harness.

FIG. 7 illustrates a second embodiment of the present invention. Instead of providing a protector, guiding portion 90 is provided on door module panel 14. Guiding portion 90 is formed by a recessed portion on module panel 14, the recessed portion opening toward the passenger compartment side of the door. The shape of the recessed portion is similar to that of protector 70 described in the first embodiment. Wire harness 40 is clamped onto module panel 14 in a predetermined construction and passes through guiding portion 90. In FIG. 7, module panel 14 is equipped with various electronic components (not shown) for a door, including speaker 15, which are connected to wire harness 40. Since other configurations are identical to those described in the first embodiment use, identical numbers are assigned and descriptions of their operations are thus omitted.

Figure 11:
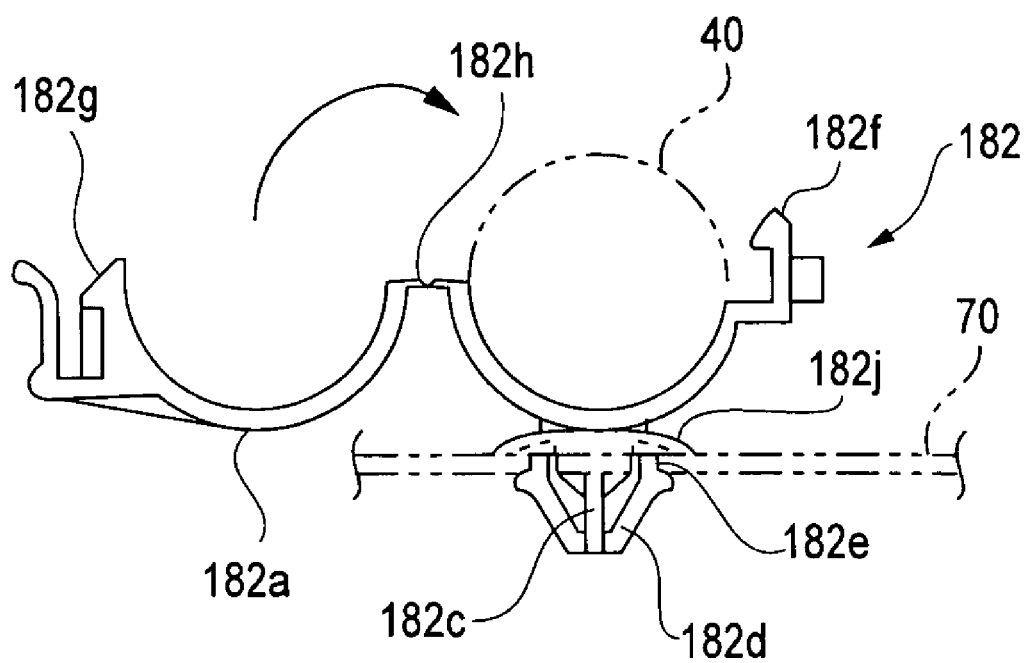
FIG. 11 is a front elevational view of a clamp of the wire harness construction according to a third embodiment of the present invention.

FIG. 11 illustrates a third embodiment of the present invention. Clamp 182 may be formed integrally and in one piece of any suitable material such as, for example, an elastic resin. Band 182a is formed of two halves, an upper half and a lower half, which may be opened and closed. Connecting portion 182h forms a thin formed hinge; and an upper half of band 182a is configured to rotate around connecting portion 182h. Male and female hook portions 182g and 182f, respectively, may be connected by mating with each other, sandwiching wire harness 40 therebetween. As a result, an easy assembly of wire harness 40 may be achieved. 182j indicates a spacer that has a thin planar shape facing downward and has a spring force; 182j absorbs margins of manufacturing error of protector 70 and clamp 182, eliminating backlash between clamp 182 and protector 70, while avoiding fixation in a rotating direction. Spacer 182j serves as a spacer that keeps a predetermined distance between wire harness 40 and a wall of protector 70, thereby preventing wire harness 40 from directly contacting and causing friction with the wall of protector 70.

FIGS. 12A, 12B, 13A, 13B, 14-16, 17A, 17B, and 17C illustrate a fourth embodiment of the present invention. Wire harness 40 is mounted within inner panel 111 and its ends are connected to predetermined electronic components via connectors (not shown) attached to its ends. Wire harness 40 passes through a passenger compartment side of inner panel 111 and has protector 160 attached to a side where wire harness 40 is pulled out toward body 20. Wire harness 40 has grommet 50 fixed onto one end. Wire harness 40 having protector 160 and grommet 50 attached is pulled out from a point closer to the passenger compartment side than the weather strip on the body side surface of inner panel 111, and grommet 50 is fixedly inserted into attachment hole 22 of body 20.

Figure 14:
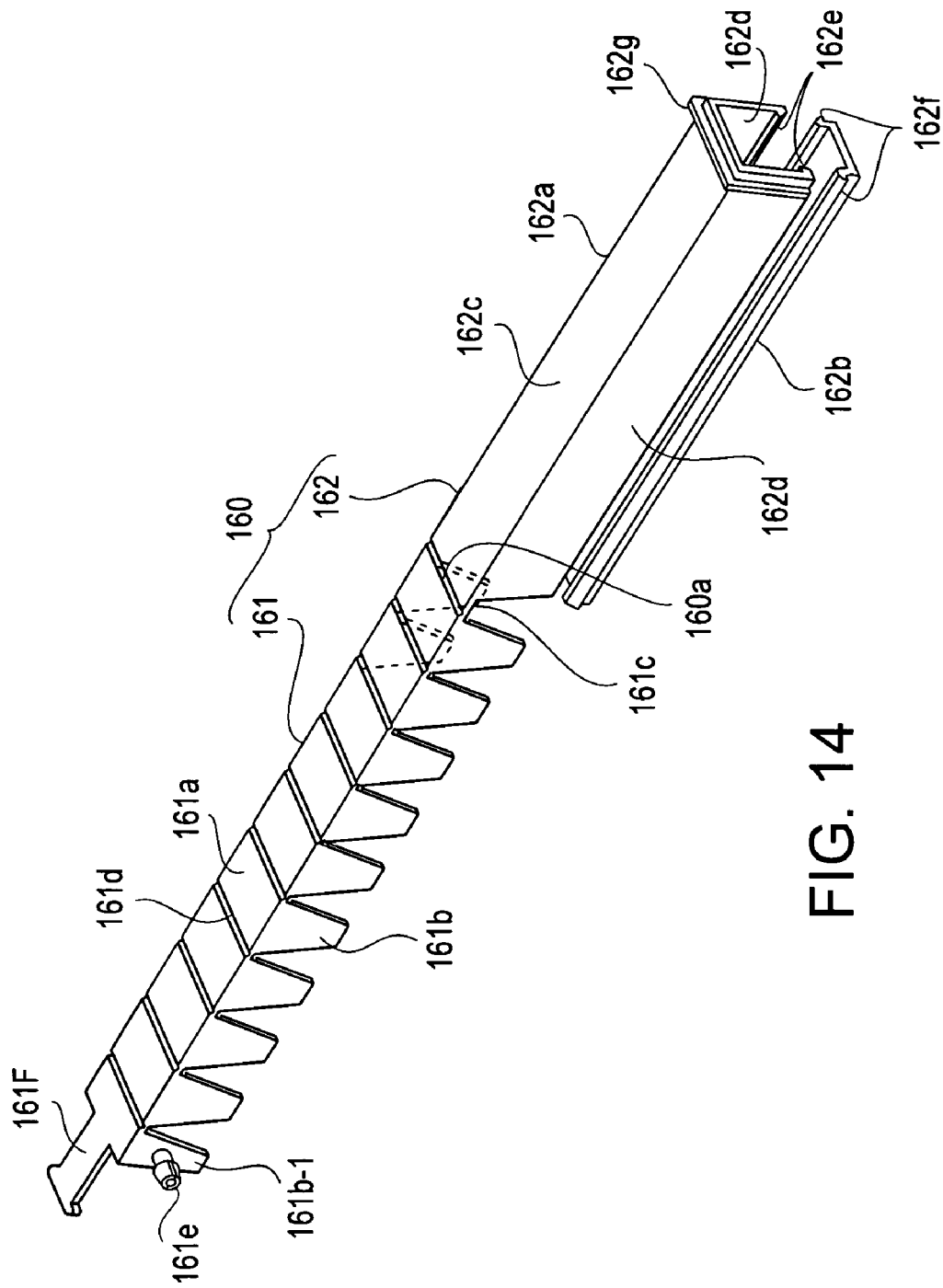
FIG. 14 is a perspective view of a protector of the wire harness construction according to FIG. 12A.
Figure 15:
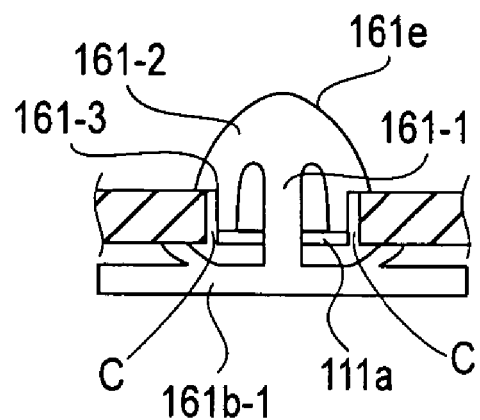
FIG. 15 is a cross sectional view showing the protector of the wire harness construction according to FIG. 12A attached to an inner panel by a clamp.

As shown in FIG. 14, protector 160 connects a bendable caterpillar-shaped protector 161 to straight tubular protector 162 in a longitudinal direction. Protector 160 may formed integrally and in one piece; and protector 160 may formed of any suitable material such as, for example, a resin. While caterpillar-shaped protector 161 is attached to surplus length portion 40 provided in wire harness 40, which is provided within door 10, straight tubular protector 162 is attached to an arrangement portion of wire harness 40, which is located at a point closer to the body 20 than surplus length portion 40a. Straight tubular protector 162 is configured such that it can not be easily bent. Further, straight tubular protector 162 may be made of any suitable material such as, for example, a hard resin. Caterpillar-shaped protector 161 may be made of the same hard resin as that used in straight tubular protector 162 or may be formed integrally and in one piece of a resin softer than the hard resin used in straight tubular protector 162, thereby forming a two-color configuration.

Caterpillar-shaped protector 161 includes connecting portion 161a having a short length in its longitudinal direction and substantially trapezoidal small piece portions 161b and 161c projecting from both side edges of connecting portion 161a, dividing connecting portion 161a in its longitudinal direction. More particularly, a pair of small piece portions 161b and 161c facing each other via connecting portion 161a is arranged in parallel, with spaces in between. Connecting portion 161a having no small piece portions 161b and 161c has a thin wall, and hinge 161d serves as a bending fulcrum. Caterpillar-shaped protector 161 is attached to surplus length portion 40a of wire harness 40. A periphery of surplus portion 40a is covered by connecting portion 161a in a bending condition. Small piece portions 161b and 161c projecting from connecting portion 161a are attached in a manner such that they wrap surplus length portion 40a from both sides toward an inner peripheral side.

Small piece portion 161b is positioned on the inner panel 111 side, and small piece portion 161c is positioned on a door trim side. Small piece portions 161b and 161c slide in contact with inner panel 111 and the door trim, thereby preventing surplus length portion 40a of wire harness 40 from directly contacting inner panel 111 and the door trim.

Straight tubular protector 162 includes main body 162a that has a U-shape in cross section with an opening at the bottom thereof and lid portion 162b that covers the bottom opening of main body 162a. After wire harness 40 is passed through main body 162a, lid portion 162b is fixedly connected to main body 162a, forming a tubular body having a square-shape in cross-section, which covers the entire periphery of wire harness 40.

Upper wall portion 162c of main body 162a is connected to upper wall portion 161a of caterpillar-shaped protector 161 via thin wall hinge portion 160a in a longitudinal direction. Side wall portions 162d of main body 162a are respectively positioned between wire harness 40 and inner panel 111 and between wire harness 40 and the door trim as small piece portions 161b and 161c of caterpillar-shaped protector 161.

Locking claws 162e extending along the longitudinal direction extend from a lower end inner side of side wall portions 162d of main body 162a of straight tubular protector 162. Locking claws 162f extend outward from both ends of lid portion 162b along the longitudinal direction. Lid portion 162b is fixedly connected by locking claws 162e and locking claws 162f so as to close the bottom opening of main body 162a.

Moreover, flange 162g projects from one end of straight tubular protector 162. Flange 162g fixes the entire periphery of straight tubular protector 162 to grommet 50. Flange 162g may be formed integrally and in one piece with straight tubular protector 162. Alternatively, flange 162g may include a separate ring that may be fixedly fitted onto straight tubular protector 162 in place of flange 162g.

Tape winding tongue 161f projects from an end portion opposite to straight tubular protector 162 of connecting portion 161a in a longitudinal direction of protector 160. Tape winding tongue 161f is fixed to wire harness 40 by winding tape T.

Protector guide 130 is attached to inner panel 111 of door 10, adjacent to where the wire harness 40 is pulled out, so as to slidably support straight tubular protector 162.

More particularly, while straight tubular protector 162 connects to caterpillar-shaped protector 161 and its end is slidably attached to inner panel 111 through protector guide 130, the other end of caterpillar-shaped protector 161 is rotatably attached to inner panel 111 through clamp 161e.

Figure 16:
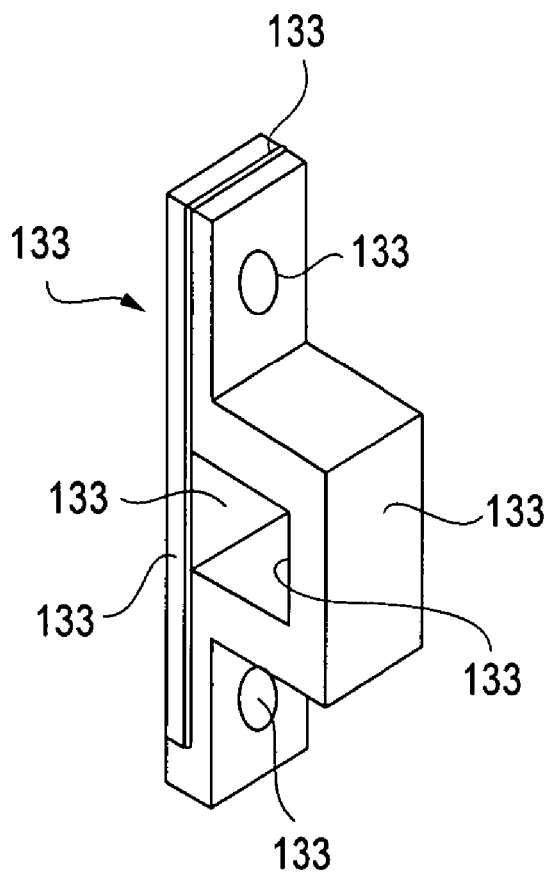
FIG. 16 is a perspective view of a protector guide of the wire harness construction according to FIG. 12A.

As shown in FIG. 16, protector guide 130 includes a first thin holder 131 and a second thin holder 132. One end of the first thin holder 131 and one end of the second thin holder 132 are connected by thin wall hinge portion 133. While the first thin holder 131 has a substantially planar shape, the second thin holder 132 has groove or recess 134 that extends along the width direction. After straight tubular protector 162 is passed through groove 134, the first thin holder 131 is folded back at thin wall hinge portion 133, and locking portions at the other ends of the first thin holder 131 and the second thin holder 132 are fixedly connected to a locked portion (not shown). When the first thin holder 131 and the second thin holder 132 are fixedly connected, sliding hole 135 is formed by groove 134 between the first thin holder 131 and the second thin holder 132. In this condition, straight tubular protector 162 attached to wire harness 40 is slidably inserted into sliding hole 135. In this condition, screw hole 136 connected into the first holder 131 and the second holder 132 is connected by screwing into a screw hole (not shown) formed on inner panel 111, thereby fixing protector guide 130 to inner panel 111.

Figure 17A:
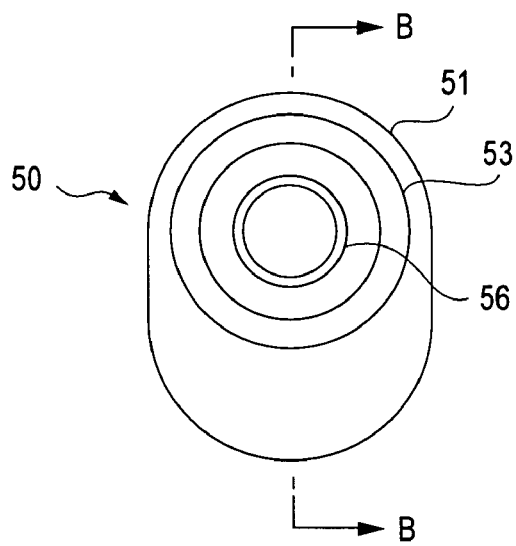
FIG. 17A is a front elevational view of a grommet, when viewed from the door side of the vehicle body, of the wire harness construction according to FIG. 12A.
Figure 17B:
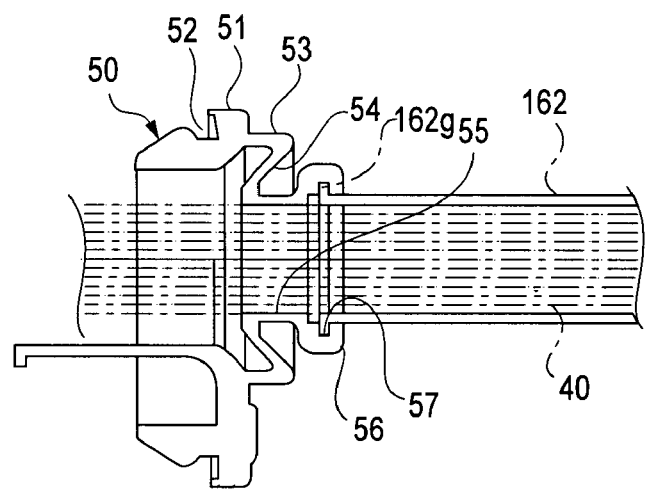
FIG. 17B is a cross-sectional view taken along line B—B of the grommet of FIG. 12A.
Figure 17C:
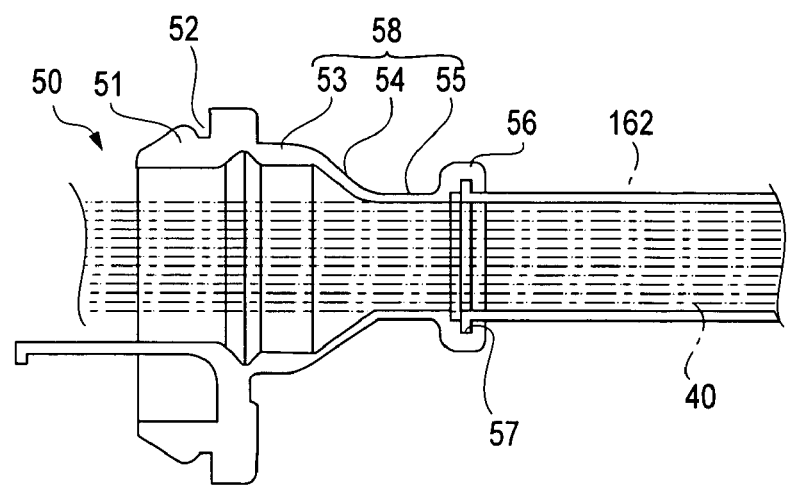
FIG. 17C is a cross-sectional view taken along line B—B of the grommet of FIG. 12A in an extended condition.
Figure 18:
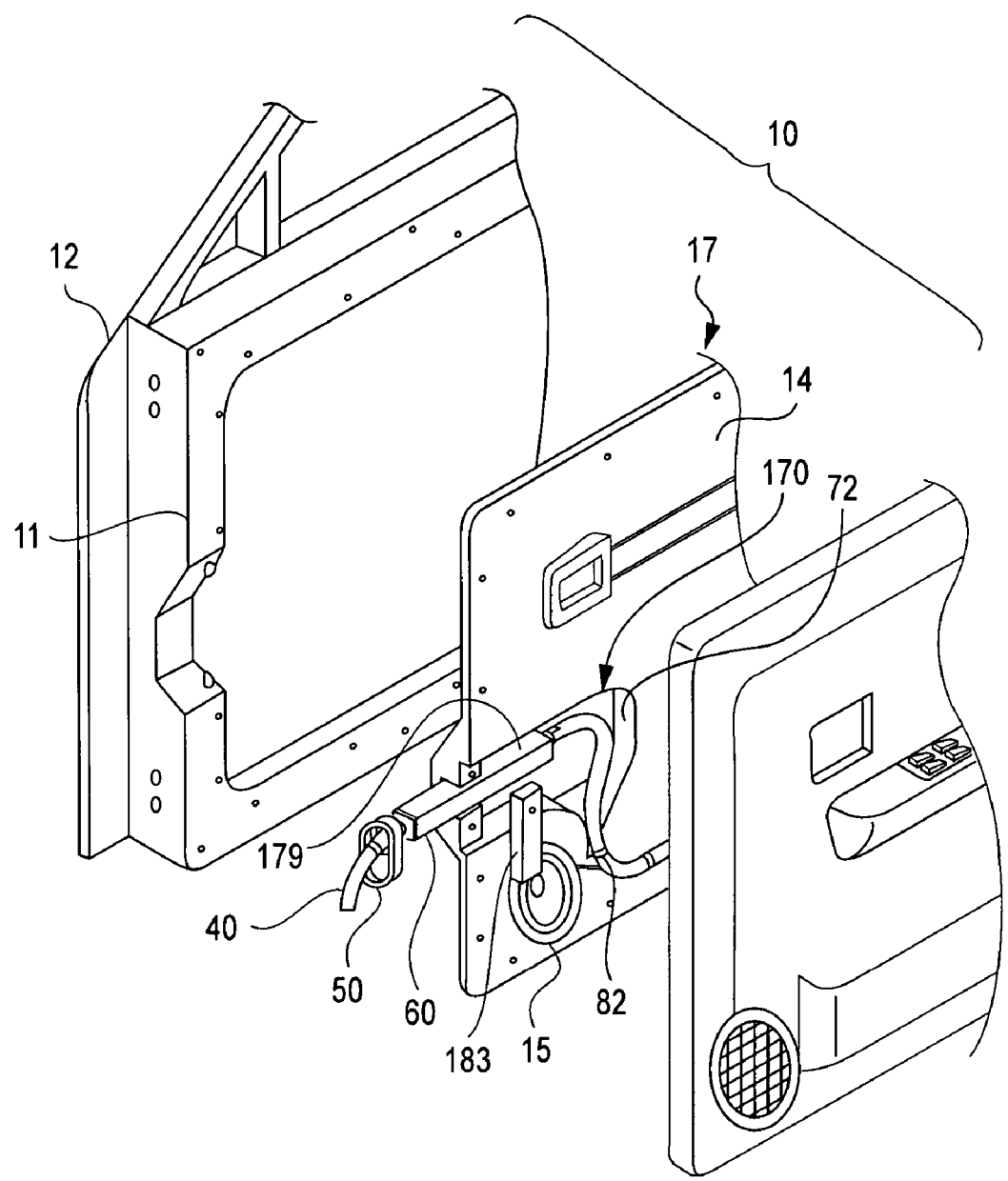
FIG. 18 is a perspective view of a wire harness construction according to a fifth embodiment of the present invention.
Figure 19A:
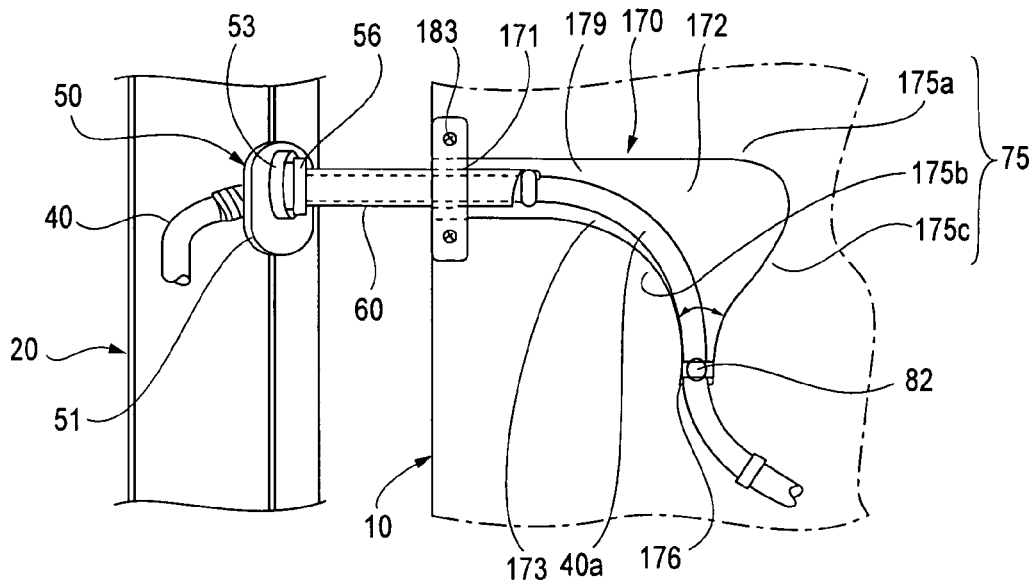
FIG. 19A is a side elevational view of an open side door, when viewed from the passenger compartment, including the wire harness construction according to FIG. 18.
Figure 19B:
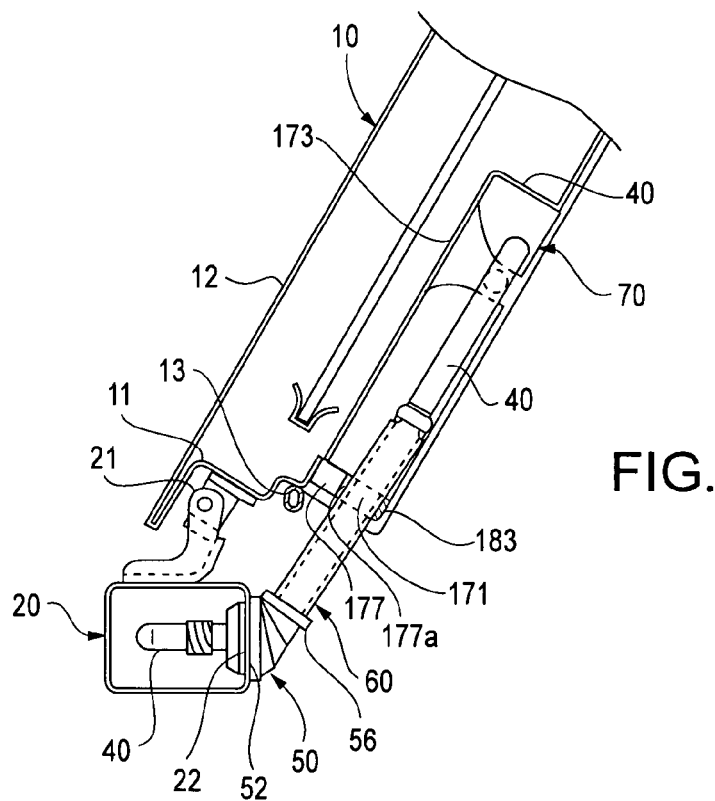
FIG. 19B is a cross-sectional view of the open side door including the wire harness construction according to FIG. 18.
Figure 20A:
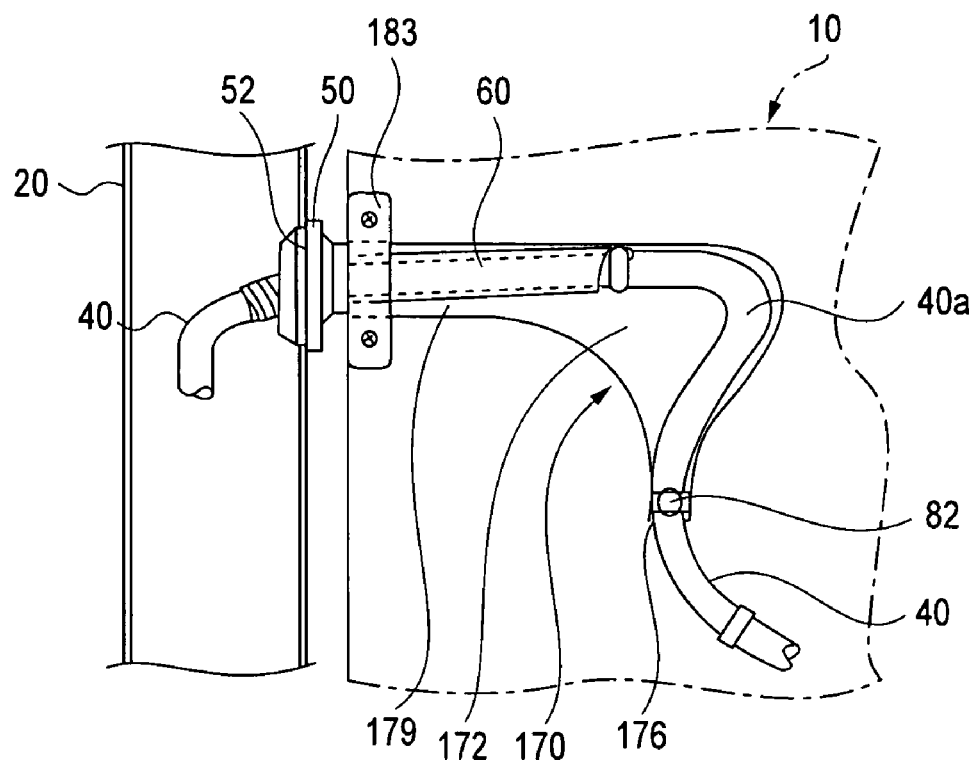
FIG. 20A is a side elevational view of the closed side door, when viewed from the passenger compartment side, including the harness construction according to FIG. 18.
Figure 20B:
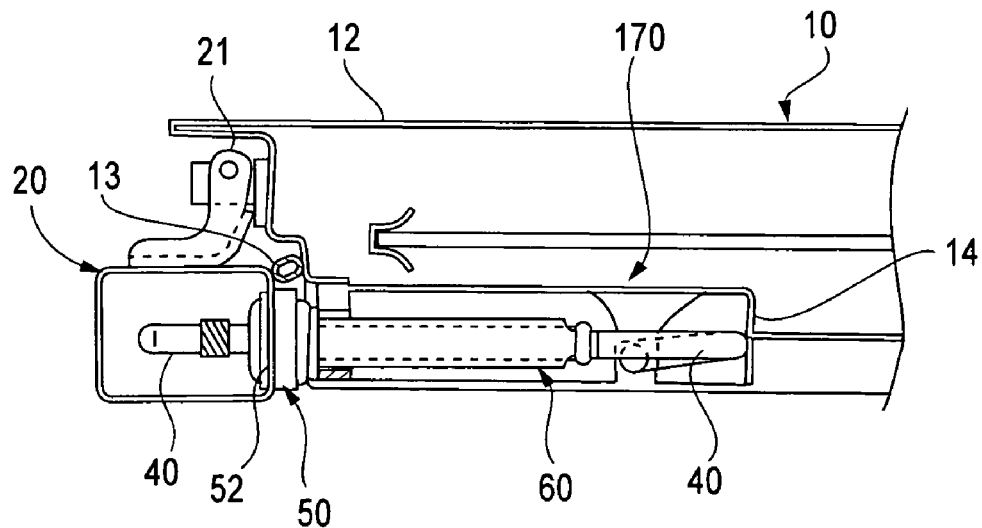
FIG. 20B is a cross-sectional view of the closed side door including the wire harness construction according to FIG. 18.

As shown in FIGS. 17A–17C, protector locking groove 57 of grommet 50 is positioned within connecting tubular portion 56 in a projecting manner. Flange 162g of straight tubular protector 162 is fitted into protector locking groove 57.

In the present embodiment, even when the door is closed, a required clearance is provided between grommet 50 and protector guide 130. Connecting tubular portion 56 has an outer diameter that prevents connecting tubular portion 56 from passing through sliding hole 135 of protector guide 130. At the closing of the door, connecting tubular portion 56 comes into contact with the periphery of sliding hole 135 and is fixed thereon in a collapsed condition. This configuration prevents occurrence of abnormal sounds in reaction to body vibrations even when there is a backlash between straight tubular protector 162 and sliding hole 135 of protector guide 130.

Figure 12A:
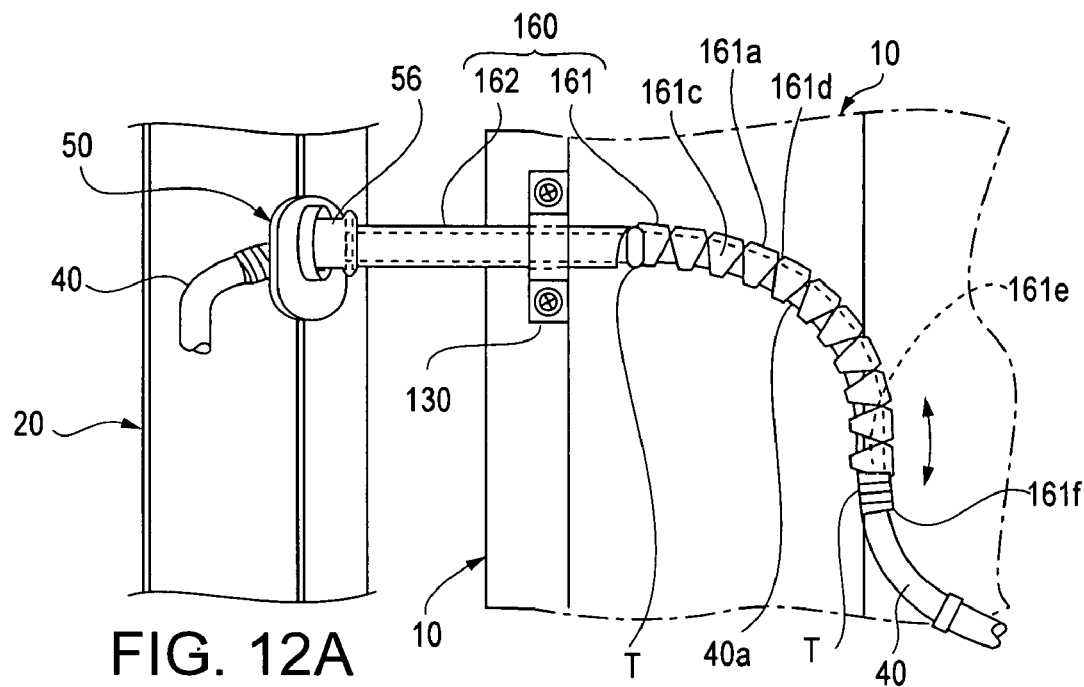
FIG. 12A is a side elevational view of an open side door, when viewed from the passenger compartment, including a wire harness construction according to a fourth embodiment of the present invention.
Figure 12B:
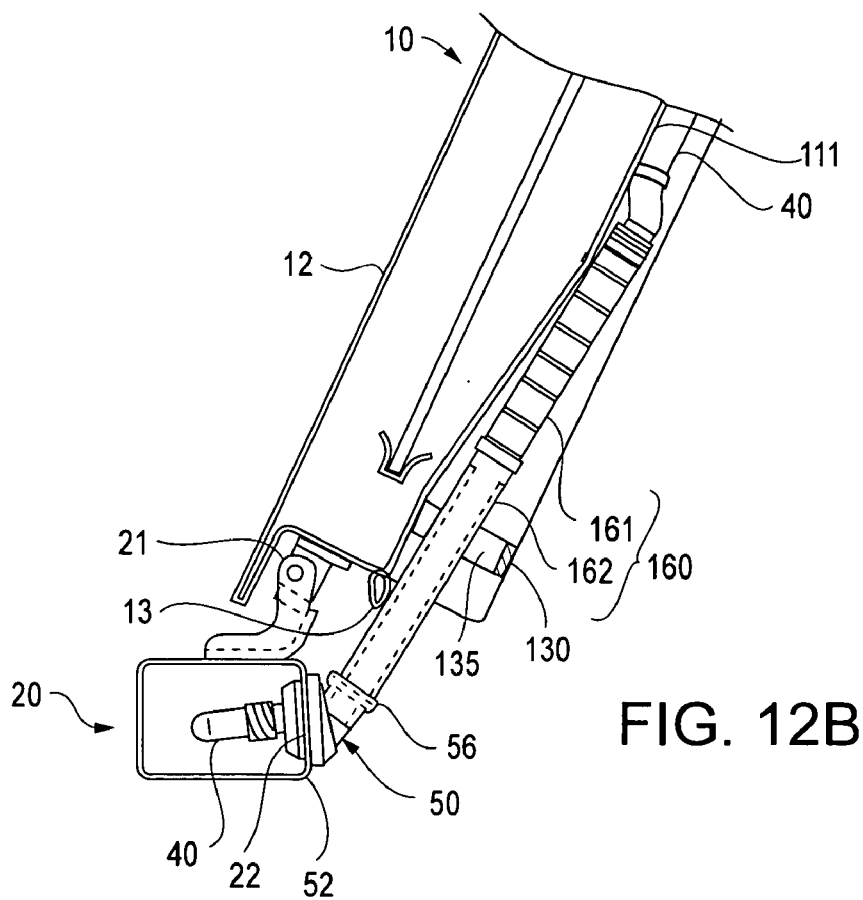
FIG. 12B is a cross-sectional view of the open side door including the wire harness construction according to FIG. 12A.
Figure 13A:
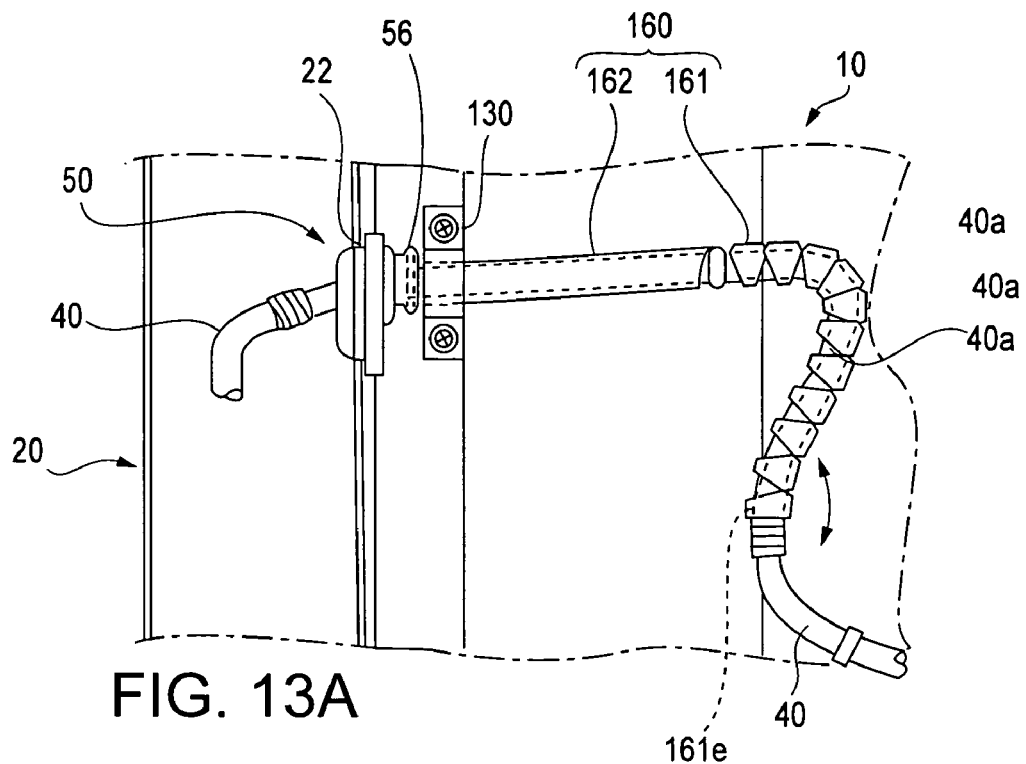
FIG. 13A is a side elevational view of the closed side door, when viewed from the passenger compartment side, including the harness construction according to FIG. 12A.
Figure 13B:
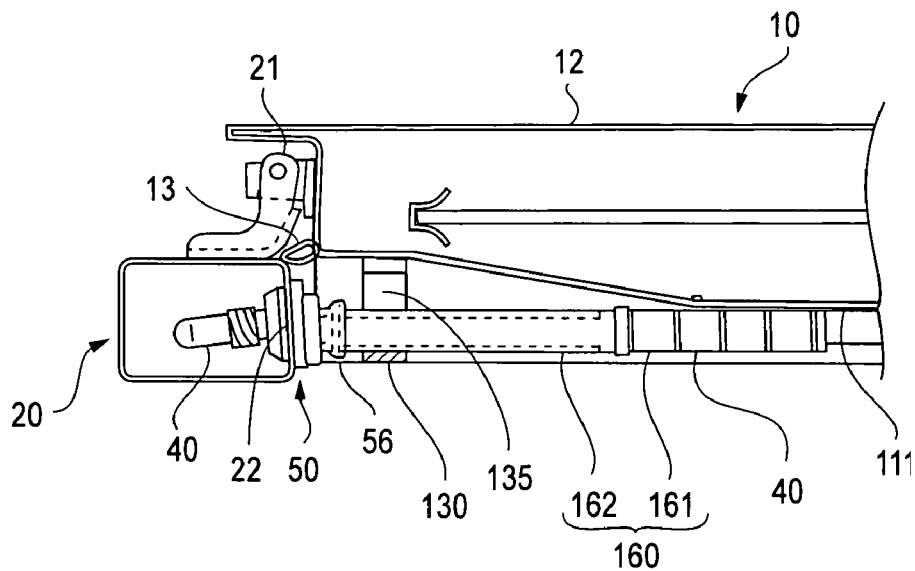
FIG. 13B is a cross-sectional view of the closed side door including the wire harness construction according to FIG. 12A.

The following describes operations of wire harness 40 at the opening and closing of the door, in the construction of the wire harness according to the fourth embodiment of the present invention. When the closed door 10 shown in FIGS. 13A and 13B is opened as shown in FIGS. 12A and 12B, thin-wall connection tubular portion 54 of grommet 50 is bent according to rotation of door 10, thereby allowing grommet 50 to follow the bend of wire harness 40 mounted on door 10. Further, at the opening of door 10, the rotation fulcrum of door 10 is located away from the point where wire harness 40 is mounted. Thus, it is necessary to extend wire harness 40 to follow the opening/closing operations of the door. When door 10 is closed as shown in FIGS. 13A and 13B, surplus length portion 40a of wire harness 40 is bent. From this condition, straight tubular protector 162 moves within sliding hole 135 of protector guide 130 toward the left in FIGS. 13A and 13B, following the opening operation of door 10. Straight tubular protector 162 is then pulled out toward the body 20. In accordance with this movement, surplus length portion 40a, along with caterpillar-shaped protector 161, is pulled out, changing from a curved state to an inclined state to reach the state illustrated in FIG. 12A.

When door 10 is closed from the opened state shown in FIG. 12A, an operation reverse to an opening operation is performed, wherein wire harness 40, along with straight tubular protector 162, is pushed into door 10. Surplus length portion 40a of wire harness 40, along with caterpillar-shaped protector 161, is pulled in while being bent, and caterpillar-shaped protector 161 is supported in a bent condition. Moreover, grommet 50 gets shorter and is accommodated between body 20 and door 10.

As described above, since wire harness 40, which slides in and out from sliding hole 135 of protector guide 130 in the opening/closing operation of door 10, is protected by tubular protector 162, wire harness 40 moves straight without being bent, thereby enabling its smooth entry/exit. Moreover, because wire harness 40 is protected by tubular protector 162 in the entry/exist operation, no damage occurs to wire harness 40.

Because caterpillar-shaped protector 161 attached to surplus length portion 40a of wire harness 40 is easily bent at a plurality of thin wall hinge portions 161c, which are formed in the longitudinal direction with predetermined spaces, surplus length portion 40a may be bent by following the opening/closing operation of the door.

A fifth embodiment of the present invention is described in FIGS. 18, 19A, 19B, 20A, and 20B. Module panel 14 may be formed of any suitable material such as, for example, resin. Wire harness 40, electric components, such as speaker 15, connected to wire harness 40, and other equipment are mounted on module panel 14. These components together form door module 17. Door module 17 may be assembled at an auto parts factory and then installed in a door at an automobile assembly line.

At entry/exit opening 171 provided on one end of sliding space 179, closed wall 177 is positioned between upper peripheral wall 175a and side peripheral wall 175b, and aperture 177a, which has an opening on the door trim side, is formed on closed wall 177. The wire harness passes through aperture 77a. The opening of aperture 177a on the door trim side is covered by support plate 183, which is attached by any suitable device such as, for example, screws.

Since support plate 183 is detachable, aperture 177a is different from a through-hole. It makes installation and removal of a wire harness easy and improves workability not only at a manufacturing facility but also at a service factory.

Figure 21A:
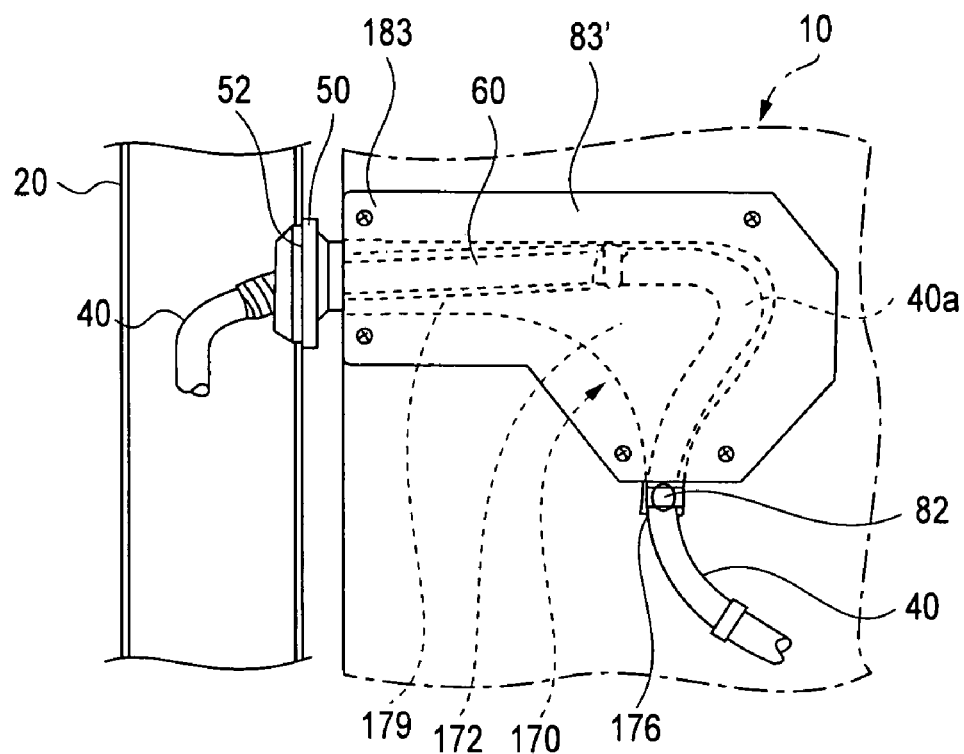
FIG. 21A is a side elevational view of a closed side door, when viewed form the passenger compartment side, including a wire harness construction according to a sixth embodiment of the present invention.
Figure 21B:
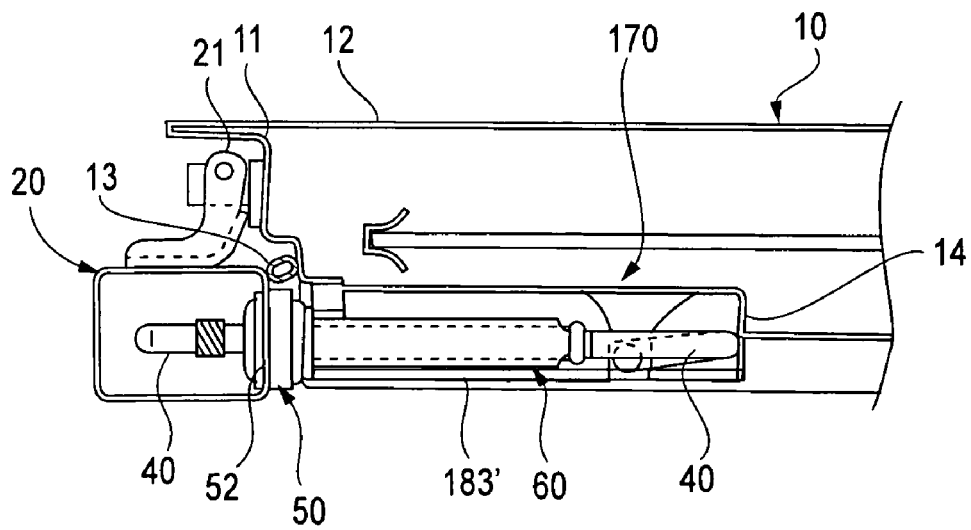
FIG. 21B is a side elevational view of the open side door including the wire harness construction according to FIG. 21A.

FIGS. 21A and 21B illustrate a sixth embodiment of the present invention. In the sixth embodiment, the shape of support plate 183' is different from the fifth embodiment. More particularly, as FIGS. 21A and 21B show, support plate 183' has such a shape as to cover nearly the entire surface of recessed guiding portion 170. However, pull-out opening 176, which is a lower-edge opening between the pair of side peripheral walls 175b and 175c of sliding space 179, is not covered and remains opened. From this opening, wire harness 40 inserted into recessed guiding portion 170 is pulled out to the door side.

After wire harness 40 is arranged in recessed guiding portion 170, support plate 183' is attached to module panel 14 by using clips (not shown) that are integrally formed on support plate 183' or by using separate screws.

According to above-noted configuration, since nearly the entire surface of recessed guiding portion 170 is covered by support plate 183' of the second embodiment, wire harness 40 being passed through recessed guiding portion 170 can be protected by support plate 183' from external interfering objects during transportation, thereby preventing wire harness 40 from being damaged.

Since other configurations are identical to those described in the first embodiment, identical numbers are assigned and descriptions of their operations are thus omitted.

The above-described embodiment relates to a construction of a wire harness that is provided between a side door of a vehicle and a vehicle body. However, the present invention is not limited to a side door, and may be suitably used for a wire harness that is provided between a vehicle body and a rear door, or between a vehicle trunk and a trunk lid.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

What is claimed is:

1. A wire harness construction for installation between a vehicle body and an opening and closing member connected to the vehicle body by a hinge in a manner allowing the wire harness to extend, contract and rotate, said wire harness construction comprising:
  a grommet fitted onto one end of the wire harness, the wire harness being configured for arrangement in the opening and closing member to be pulled toward the vehicle body;
  a body locking portion provided on an outer peripheral surface of a first end face of said grommet so as to be inserted and locked in an attachment hole of the vehicle body;
  a diaphragm portion provided between said body locking portion and a second end of the wire harness, said diaphragm portion being configured to swing, extend, and contract from the body locking portion;
  a tube having a predetermined length fitted onto the wire harness and being configured to be pulled out from said second end of said grommet, said tube having a first end fixed to said grommet and a second end fixed onto the wire harness;
  a guiding portion configured to slidably receive said tube, said guiding portion being configured to be provided in the opening and closing member;
  a surplus length portion of the wire harness configured to be pulled out from said tube, said surplus length portion allowing the wire harness to follow an opening and closing operation of the opening and closing member; and
  a surplus length absorbing space configured to receive the surplus length portion of the wire harness, said surplus length absorbing space being provided in said guiding portion and the wire harness being locked onto the opening and closing member at an exit position of said surplus length absorbing space.

2. The wire harness construction according to claim 1, wherein said diaphragm portion of said grommet connects a large-diameter tubular portion and a small-diameter tubular portion through a thin-wall connection tubular portion, said thin-wall connection tubular portion being inserted into the large-diameter tubular portion in a folded condition; and
  wherein, upon opening of the opening and closing member, said thin-wall connection tubular portion is configured to be bent while being pulled out from said large-diameter tubular portion.

3. The wire harness construction according to claim 1, wherein said guiding portion of the opening and closing member has an opening that allows said tube to slidably pass through without letting said grommet through.

4. The wire harness construction according to claim 1, wherein said guiding portion connects a sliding space and said surplus length absorbing space, said sliding space configured to slidably receive said tube, and said surplus length absorbing space configured to receive the surplus length portion of the wire harness in a bent condition, wherein said guiding portion is formed by a substantially triangle shaped protector fixed to the opening and closing member.

5. The wire harness construction according to claim 4, wherein a protective component is attached to the surplus length portion of the wire harness, and wherein the protective component abuts an inner surface of said protector.

6. The wire harness construction according to claim 1, wherein the opening and closing member is one of a side door, a rear door, and a trunk lid.

7. The wire harness construction according to claim 1, wherein the opening and closing member comprises a side door, the side door including said guiding portion on a passenger compartment side of an inner panel of the side door, and wherein said tube being pulled out from said guiding portion passes through at a point closer to the passenger compartment than a weather-strip, said grommet being locked onto the vehicle body, and the wire harness wired to the body side of the opening and closing member.

8. The wire harness construction according to claim 1, wherein said grommet is formed of an elastic material.

9. The wire harness construction according to claim 1, wherein said tube is rigid.

10. A wire harness construction for installation between a vehicle body and an opening and closing member connected to the vehicle body by a hinge in a manner allowing the wire harness to extend, contract, and rotate, said wire harness construction comprising:
  a surplus length portion provided in the wire harness, said surplus length portion configured to allow the wire harness to follow an opening and closing operation of the opening and closing member;
  a tube fixed onto the wire harness extending from said surplus length portion to a body side of the opening and closing member; and
  a surplus length absorbing space provided in a guiding portion, said surplus length absorbing space slidably receiving said tube in the opening and closing member and the surplus length portion of the wire harness;
  wherein the wire harness is rotatably locked by a clamp to the opening and closing member at an exit of said guiding portion; and
  wherein said guiding portion comprises:
  a protector, said protector being fixed to the opening and closing member; and
  a substantially round locking hole formed at the exit of said protector;
  wherein said clamp attached to the wire harness includes a band, said clamp rotatably locking a locking wing portion into said locking hole, the locking wing portion being provided in a folded condition at a shaft projecting from said band locking portion.

11. The wire harness construction according to claim 10, wherein the opening and closing member is a side door, said protector is attached to a passenger compartment side of the inner panel of the side door, said tube is slidably received in the exit of said protector, said tube passes through at a point closer to the passenger compartment side of the opening and closing member than a weather-strip and extends to the body side, a grommet is fixed onto an end of said tube, said grommet is fixedly inserted into the locking hole of the body, and the exit of the protector has a smaller diameter than that of the grommet so as to prevent the grommet from entering the protector.

* * * * *